United States Patent
Guo et al.

(10) Patent No.: US 9,236,980 B2
(45) Date of Patent: Jan. 12, 2016

(54) CONTROL CHANNEL TRANSMITTING, RECEIVING METHOD, BASE STATION AND TERMINAL

(71) Applicants: Senbao Guo, Shenzhen (CN); Yijian Chen, Shenzhen (CN); Bo Dai, Shenzhen (CN); Yunfeng Sun, Shenzhen (CN); Junfeng Zhang, Shenzhen (CN)

(72) Inventors: Senbao Guo, Shenzhen (CN); Yijian Chen, Shenzhen (CN); Bo Dai, Shenzhen (CN); Yunfeng Sun, Shenzhen (CN); Junfeng Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/348,920

(22) PCT Filed: May 31, 2013

(86) PCT No.: PCT/CN2013/076547
§ 371 (c)(1),
(2) Date: Apr. 1, 2014

(87) PCT Pub. No.: WO2013/178088
PCT Pub. Date: Dec. 5, 2013

(65) Prior Publication Data
US 2015/0078266 A1    Mar. 19, 2015

(30) Foreign Application Priority Data

May 31, 2012  (CN) .......................... 2012 1 0176691

(51) Int. Cl.
*H04W 4/00* (2009.01)
*H04L 5/00* (2006.01)
*H04W 72/04* (2009.01)

(52) U.S. Cl.
CPC .............. *H04L 5/003* (2013.01); *H04L 5/0053* (2013.01); *H04L 5/0091* (2013.01); *H04W 72/042* (2013.01)

(58) Field of Classification Search
None
See application file for complete search history.

(56) References Cited

U.S. PATENT DOCUMENTS

| | | | | |
|---|---|---|---|---|
| 2011/0222503 | A1* | 9/2011 | Nakao | H04L 5/0023 370/329 |
| 2011/0261767 | A1* | 10/2011 | Ji | H04L 5/0053 370/329 |
| 2012/0020323 | A1 | 1/2012 | Noh et al. | |
| 2012/0082130 | A1* | 4/2012 | Xue | H04L 5/001 370/330 |
| 2012/0113844 | A1 | 5/2012 | Krishnamurthy | |
| 2014/0092836 | A1* | 4/2014 | Park | H04L 1/0038 370/329 |
| 2014/0140310 | A1* | 5/2014 | Liu | H04W 48/12 370/329 |
| 2014/0141789 | A1* | 5/2014 | Tarokh | H04W 72/02 455/450 |
| 2014/0153452 | A1* | 6/2014 | Son | H04L 5/001 370/280 |
| 2015/0003407 | A1* | 1/2015 | Seo | H04L 25/0224 370/330 |
| 2015/0189628 | A1* | 7/2015 | Pan | H04L 1/00 370/329 |
| 2015/0223210 | A1* | 8/2015 | Guo | H04W 72/04 370/329 |

FOREIGN PATENT DOCUMENTS

| | | |
|---|---|---|
| CN | 101729133 A | 6/2010 |
| CN | 102468926 A | 5/2012 |

OTHER PUBLICATIONS

International Search Report for PCT/CN2013/076547 dated Jul. 1, 2013.

* cited by examiner

*Primary Examiner* — Otis L Thompson, Jr.
(74) *Attorney, Agent, or Firm* — Ling Wu; Stephen Yang; Ling and Yang Intellectual Property

(57) ABSTRACT

A method for transmitting and receiving a control channel, a base station and a terminal relate to a long term evolution advanced system. The method for transmitting a control channel disclosed by the present document includes: a base station side configuring, for a terminal side, detection-limited subframe cluster information of a control channel, so as to notify the terminal side of the manner by which the base station side transmits the control channel. The present document also discloses a method for receiving a control channel, a base station and a terminal.

24 Claims, No Drawings

CONTROL CHANNEL TRANSMITTING, RECEIVING METHOD, BASE STATION AND TERMINAL

TECHNICAL FIELD

The present document relates to a Long term evolution advanced system (LTE-Advanced for short), and in particular, to a solution of transmitting and receiving an enhanced control channel in the LTE-Advanced.

BACKGROUND OF THE RELATED ART

In the LTE Release8/9, in order to measure the channel quality and demodulate the received data symbols, a Common Reference Signal (CRC) is designed, so that the User Equipment (UE) can measure the channel through the CRC, thus deciding that the UE reselects the cell and hands over to a target cell, and measures the channel quality when the UE is in a connected state, and when the interference level is higher, the physical layer can disconnect the connection through high-layer related wireless link connection failure signaling. In the LTE R10, in order to further enhance the average spectrum utilization rate of the cell and the spectrum utilization rate of the cell border and the throughput of various UEs, two reference signals are defined respectively, i.e., Channel Statement Information Reference Signal (CSI-RS) and Demodulation Reference Signal (DMRS), wherein, the CSI-RS is used for the measurement of the channel, and the Precoding Matrix Indicator (PMI), Channel Quality Indicator (CQI) and Rank Indicator (RI) required to be fed back to the eNB by the UE can be calculated through the measurement of the CSI-RS. For the demodulation of the downlink shared channel, the DMRS demodulation can be used to reduce interference between different receiving sides and various cells with a beam method, and can reduce the performance reduction caused by the codebook granularity, and reduce the overhead of the downlink control signaling to some extent (since the bit overhead of the PMI needs not to be added on the physical downlink control channel).

In the LTE R8, R9 and R10, the physical downlink control channels are primarily distributed on first 1 or 2 or 3 Orthogonal Frequency Division Multiplexing (OFDM) symbols of one subframe, and the specific distribution needs to be configured according to different subframe types and the number of CRS ports, as illustrated in Table 1.

The Physical Downlink Control Channel (PDCCH) refers to the downlink control channel of R8/R9/R10.

Each receiving side needs to perform a blind detection on the first three symbols, and the initial location of the blind detection and the number of elements of the control channels are related to the temporary identities of the wireless network allocated to the receiving side and different control information. Generally, the control information can be divided into public control information and dedicated control information, and the public control information is generally located in a public search space of the physical downlink control channel, and the dedicated control can be located in all public spaces and the dedicated search space. After the receiving side performs the blind detection, it determines whether the current subframe comprises the public system message, the downlink or the uplink scheduling information. As such downlink control information does not comprise the HARQ feedback, it needs to ensure that the detected bit error rate is as low as possible.

In the LTE R10 heterogeneous network, as different base station types have strong interference, in consideration of the problem of interference with the Pico from the Macro eNodeB and the problem of interference with the Macro eNodeB from the Home eNodeB, a method of using the resource muting is provided to solve the problem of interference between different types of base stations, and the specific resource muting methods can be divided into muting methods based on subframes, for example, the ABS method, and methods based on resource elements, for example, the CRS muting method.

The above method not only increases the waste of resources, but also brings large limitation on the scheduling, especially when considering the ABS configuration of the Macro eNodeB, if the more the Picos which are distributed are, the more the ABSs configured by the Macro eNodeB are, thus bringing large influence on the Macro eNodeB, which will increase the waste of resources while increasing the delay of the scheduling. While for the control channel, the interference of the data resources of different control channels can be reduced under the ABS, but the problem of interference of CRS resources and data resources can not be solved, while for the muting CRS method, the interference between data resources can not be solved, and the backward compatibility of this method is not good, which increases the accessing time delay while possibly requires more standardized efforts.

In the LTE R11 phase, more users may be introduced to transmit on the MBSFN subframes, thus resulting in insufficiency of the capacity of the PDCCH which can be carried by the 2 OFDM symbols configured by the MBSFN, and in order

TABLE 1

The number of OFDM symbols for PDCCH

| Subframes | Number of OFDM symbols of the PDCCH with $N_{RB}^{DL} > 10$ | Number of OFDM symbols of the PDCCH with $N_{RB}^{DL} \leq 10$ |
|---|---|---|
| subframes 1 and 6 of subframe type 2 | 1, 2 | 2 |
| the MBSFN subframe on the carrier supporting PDSCH, and the CRS is configured with 1 or 2 ports | 1, 2 | 2 |
| the MBSFN subframe on the carrier supporting PDSCH, and the CRS is configured with 4 ports | 2 | 2 |
| the subframe on the transmission carrier not supporting PDSCH | 0 | 0 |
| the non-MBSFN subframe configured as PRS (except for the subframe 6 of the frame structure type 2) | 1, 2, 3 | 2, 3 |
| all other cases | 1, 2, 3 | 2, 3, 4 | to ensure the backward compatibility with the R8/R9/R10 users, it needs to evolve new resources for transmitting control information on the PDSCH resources (ePDCCH for short hereinafter), and COMP technology is introduced in the R11 phase, which can solve the problem of interference between different types of cells by means of spatial division, and save the overhead of the resources, avoid the waste of resources due to the muting, and reduce the limitation on the scheduling. However, it can not solve the problem by the spatial division method according to the current time-domain PDCCH manner, and in consideration of the backward compatibility with the R8 and R9, the control channel manner of the time-domain PDCCH must be reserved, and at this time, how to use the spatial division technology to solve the interference between the control channels needs to introduce a new control channel, i.e., Enhanced Physical Downlink Control Channel (ePDCCH). The ePDCCH can achieve good effect of the spatial division, reduce the interference between the physical downlink control signaling of different nodes, and enhance the capacity of the PDCCH of the system.

Another problem discussed for the R11 phase is the problem of insufficiency of resources of the Physical Hybrid ARQ Indicator Channel (PHICH). Since it needs to consider the support for more uplink users with respect to the R11 especially in the scene 4, the number of supportable uplink users increases obviously, the capacity of the PHICH will be limited greatly, and in the R11 discussion process, different terminals are supported to have the same uplink time-frequency resources/cyclic shift allocation/CSHopping allocation/different reference signal sequences, at this time, the traditional PHICH detection resources allocation is not applicable, and it needs to further enhance the PHICH, and thus, it is necessary to further do research into the technology for enhancing the PHICH, and such enhanced PHICH is commonly referred to as an Enhanced Physical Hybrid ARQ Indicator Channel (ePHICH).

In the current R11 conference discussion phase, another problem discussed is a problem of whether it needs to enhance the control signaling of the public search space, and that problem mainly considers whether the capacity of the current R10 public search space is limited, and the problem of interference between different nodes, especially the interference with the Pico from the Macro, and if the capacity is limited and the problem of interference is severe, it is necessary to introduce an enhanced public search space. Since the interference avoidance of the time-frequency resource locations can be performed in the PDSCH region, the enhanced public search space based on the PDSCH region is a current hot point, and such enhanced public search space based on the PDSCH region is commonly referred to as an Enhanced Common Search Space (eCSS).

SUMMARY OF THE INVENTION

The present document provides a method for transmitting and receiving a control channel, a base station and a terminal, which avoids problems, such as false detection etc., when the ePDCCH, ePHICH, eCSS and PMCH subframes or PRS subframes only configured to be transmitted on MBSFN subframes collide or resulting in that the subframes configured with excessive CSI-RS resources make available resource elements less.

In order to solve the above technical problem, the present document provides a method for transmitting a control channel, comprising:

a base station side configuring for a terminal side the detection-limited subframe cluster information of a control channel, so as to notify the terminal side of a manner by which the base station side transmits the control channel;

wherein, the manner by which the base station side transmits the control channel is that the control channel is only transmitted on subframes outside the detection-limited subframe cluster; or the manner by which the base station side transmits the control channel is at least one or a combination of a plurality of the following manners:

the control channel is transmitted respectively in a control channel region independently configured for subframes inside the detection-limited subframe cluster and in a control channel region independently configured for the subframes outside the detection-limited subframe cluster;

the control channel is transmitted on the subframes inside the detection-limited subframe cluster according to a subframe Cyclic Prefix (CP) length configured in the detection-limited subframe cluster;

the control channel is transmitted respectively in a range of a detection aggregation level independently configured for the subframes inside the detection-limited subframe cluster and in a range of a detection aggregation level independently configured for the subframes outside the detection-limited subframe cluster;

the control channel is transmitted respectively on various parameters of detection control channel elements or detection resource units or enhanced resource element groups or resource element groups independently configured for the subframes inside the detection-limited subframe cluster and on various parameters of detection control channel elements or detection resource units or enhanced resource element groups or resource element groups independently configured for the subframes outside the detection-limited subframe cluster, wherein, the various parameters of detection control channel elements or detection resource units or enhanced resource element groups or resource element groups at least include one or more of the following: a size, a detection interval, a detection initial location, and a detection range;

the control channel is transmitted according to a detection Downlink Control Information (DCI) format type independently configured for the subframes inside the detection-limited subframe cluster and according to a detection DCI format type independently configured for the subframes outside the detection-limited subframe cluster;

the control channel is transmitted according to a number of candidate detection sets configured independently for the subframes inside the detection-limited subframe cluster and according to a number of candidate detection sets configured independently for the subframes outside the detection-limited subframe cluster;

the control channel is transmitted on a detection carrier independently configured for the subframes inside the detection-limited subframe cluster and on a detection carrier independently configured for the subframes outside the detection-limited subframe cluster;

the control channel at least includes one or more of the following:

an Enhanced Physical Downlink Control Channel (ePDCCH), an Enhanced Physical Hybrid ARQ Indicator Channel (ePHICH) and an Enhanced Channel Signaling System (eCSS).

The control channel regions, the subframe CP length, the range of the detection cluster level, the various parameters of detection control channel elements or detection resource units or enhanced resource element groups or resource element groups, the detection DCI format type, the number of candidate detection sets and the detection carrier independently configured for the subframes inside the detection-limited subframe cluster and the subframes outside the detection-limited subframe cluster are agreed on by the base station side and the terminal side in advance, or are configured for the terminal side by the base station side through dedicated or public high-layer signaling.

The base station side at least configures the detection-limited subframe cluster information of the control channel for the terminal side through one or more of the following manners:

configuring through Physical Multicast Channel (PMCH) transmission subframe configuration, through configuration of a Positioning Reference Signal (PRS) subframe only transmitted on the Multicast Broadcast Single Frequency Network (MBSFN) subframe, through configuration of a PRS subframe only transmitted on the MBSFN subframes when the subframe 0 is of a normal CP length, through MBSFN subframe configuration, through special subframe configuration of a Time Division Duplex (TDD) system, through Channel Statement Information Reference Signal (CSI-RS) subframe configuration, and through dedicated high-layer signaling configuration.

The base station side notifies the terminal side of the detection-limited subframe cluster information of the control channel using a bitmap sequence when configuring the detection-limited subframe cluster information of the control channel through the dedicated higher-layer signaling, wherein, each bit in the bitmap sequence represents one subframe or resource block.

The base station side notifies the terminal side of the detection-limited subframe cluster information of the control channel in a notification way of using a bitmap sequence and periodic configuration in conjunction with subframe offset configuration when configuring the detection-limited subframe cluster information of the control channel through the dedicated higher-layer signaling.

The bitmap sequence is of 6 bits or 10 bits or 40 bits or 24 bits.

The step of a base station side configuring for a terminal side the detection-limited subframe cluster information of a control channel comprises: the base station side notifying the terminal side of the detection-limited subframe cluster information of the control channel through a subframe offset index and periodic configuration in combination with encoding.

The step of a base station side configuring for a terminal side the detection-limited subframe cluster information of a control channel comprises:

the base station side independently configuring for the terminal side the detection-limited subframe cluster information of the ePDCCH and ePHICH respectively.

The step of a base station side configuring for a terminal side the detection-limited subframe cluster information of a control channel comprises:

the base station side independently configuring the detection-limited subframe cluster information of the ePDCCH and eCSS respectively, and uniformly configuring the detection-limited subframe cluster information of the ePDCCH and ePHICH for the terminal side.

The step of a base station side configuring for a terminal side the detection-limited subframe cluster information of a control channel comprises:

the base station side uniformly configuring for the terminal side the detection-limited subframe cluster information of the ePDCCH, PHICH and eCSS.

The method further comprises: the base station side configuring for the terminal side one or more of the following information:

PMCH transmission subframe configuration, configuration of the PRS subframe only transmitted on the MBSFN subframe. CP length configuration of the subframe 0, configuration of the PRS subframe only transmitted on the MBSFN subframes when the subframe 0 is of a normal CP length, MBSFN subframe configuration, special subframe configuration of a TDD system, CSI-RS subframe configuration.

The public high-layer signaling includes: a master information block and a system information block.

The present document further discloses a method for receiving a control channel, comprising: a terminal side receiving the detection-limited subframe cluster information of a control channel configured by a base station side, determining a manner by which the control channel is detected according to the detection-limited subframe cluster information, and detecting the control channel according to the determined manner;

wherein, the manner by which the control channel is detected by the terminal side is that the control channel is only detected on subframes outside the detection-limited subframe cluster; or the control channel is detected according to at least one or a combination of a plurality of the following manners:

the control channel is detected respectively according to a control channel region independently configured for the subframes inside the detection-limited subframe cluster on the subframes inside the detection-limited subframe cluster and according to a control channel region independently configured for the subframes outside the detection-limited subframe cluster on the subframes outside the detection-limited subframe cluster;

the control channel is detected on the subframes inside the detection-limited subframe cluster according to a subframe Cyclic Prefix (CP) length configured in the detection-limited subframe cluster;

the control channel is detected respectively according to a range of a detection aggregation level independently configured for subframes inside the detection-limited subframe cluster on the subframes inside the detection-limited subframe cluster and according to a range of a detection aggregation level independently configured for subframes outside the detection-limited subframe cluster on the subframes outside the detection-limited subframe cluster;

the control channel is detected respectively according to various parameters of detection control channel elements or detection resource units or enhanced resource element groups or resource element groups independently configured for subframes inside the detection-limited subframe cluster on the subframes inside the detection-limited subframe cluster and according to various parameters of detection control channel elements or detection resource units or enhanced resource element groups or resource element groups independently configured for subframes outside the detection-limited subframe cluster on the subframes outside the detection-limited subframe cluster, wherein, the various parameters of detection control channel elements or detection resource units or enhanced resource element groups or resource element groups include one or more of the following: a size, a detection interval, a detection initial location, and a detection range;

the control channel is detected according to a detection Downlink Control Information (DCI) format type independently configured for subframes inside the detection-limited subframe cluster on the subframes inside the detection-limited subframe cluster and according to a detection DCI format type independently configured for subframes outside the detection-limited subframe cluster on the subframes outside the detection-limited subframe cluster;

the control channel is detected according to a number of candidate detection sets configured independently for subframes inside the detection-limited subframe cluster on the subframes inside the detection-limited subframe cluster and according to a number of candidate detection sets configured independently for subframes outside the detection-limited subframe cluster on the subframes outside the detection-limited subframe cluster;

the control channel is detected on a detection carrier independently configured for subframes inside the detection-limited subframe cluster and on a detection carrier independently configured for subframes outside the detection-limited subframe cluster;

the control channel at least includes one or more of the following:

an Enhanced Physical Downlink Control Channel (ePDCCH), an Enhanced Physical Hybrid ARQ Indicator Channel (ePHICH) and an Enhanced Channel Signaling System (eCSS).

The control channel regions, the subframe CP length, the range of the detection cluster level, the various parameters of detection control channel elements or detection resource units or enhanced resource element groups or resource element groups, the detection DCI format type, the number of candidate detection sets and the detection carrier independently configured for the subframes inside the detection-limited subframe cluster and the subframes outside the detection-limited subframe cluster are agreed on by the terminal side and the base station side in advance, or are received by the terminal side through dedicated high-layer signaling, or are received by the terminal side through public high-layer signaling.

The terminal side at least receives the detection-limited subframe cluster information of the control channel configured by the base station side through one or more of the following manners:

receiving through Physical Multicast Channel (PMCH) transmission subframe configuration information, through configuration information of a Positioning Reference Signal (PRS) subframe only transmitted on Multicast Broadcast Single Frequency Network (MBSFN) subframes, through CP length configuration information of a subframe 0, through configuration information of a PRS subframe only transmitted on the MBSFN subframes when the subframe 0 is of a normal CP length, through the MBSFN subframe configuration information, through special subframe configuration information of a Time Division Duplex (TDD) system, through Channel Statement Information Reference Signal (CSI-RS) subframe configuration information, and through dedicated high-layer signaling configuration information.

The terminal side receives the detection-limited subframe cluster information of the control channel by a bitmap sequence when receiving the detection-limited subframe cluster information of the control channel configured by the base station side through the dedicated higher-layer signaling, wherein, each bit in the bitmap sequence represents one subframe or resource block.

The terminal side receives the detection-limited subframe cluster information of the control channel by a way of using a bitmap sequence and periodic configuration in conjunction with subframe offset configuration when receiving the detection-limited subframe cluster information of the control channel configured by the base station side through the dedicated higher-layer signaling.

The bitmap sequence is of 6 bits or 10 bits or 40 bits or 24 bits.

The step of a terminal side receiving the detection-limited subframe cluster information of a control channel configured by the base station side comprises: the terminal side receiving the detection-limited subframe cluster information of the control channel through a subframe offset index and periodic configuration in combination with encoding.

The step of a terminal side receiving the detection-limited subframe cluster information of a control channel configured by the base station side comprises:

the terminal side independently receiving the detection-limited subframe cluster information of ePDCCH and ePHICH respectively.

The step of a terminal side receiving the detection-limited subframe cluster information of a control channel configured by the base station side comprises:

the terminal side independently receiving the detection-limited subframe cluster information of ePDCCH and eCSS respectively, and uniformly receiving the detection-limited subframe cluster information of the ePDCCH and ePHICH.

The step of a terminal side receiving the detection-limited subframe cluster information of a control channel configured by the base station side comprises:

the terminal side uniformly receiving the detection-limited subframe cluster information of the ePDCCH, PHICH and eCSS.

The step of the base station side detecting the control channel according to the determined manner comprises:

when a CP configuration length of subframe 0 is a normal CP length, the terminal side detecting the control channel on all MBSFN subframes according to an extended CP length; or the terminal side blindly detecting the ePDCCH on the subframes inside the detection-limited subframe cluster according to an extended CP length; or the terminal side detecting the control channel in the PDCCH region and PDSCH region of all MBSFN subframes; or the terminal side using a normal CP length and an extended CP length as candidate lengths for detecting the control channel in the PDSCH region of all MBSFN subframes, if a target control channel is detected according to one length therein, not detecting with respect to another length again; or the terminal side detecting the control channel in the PDCCH region of all MBSFN subframes; or the terminal side detecting the control channel in the PDCCH region of the subframes inside the detection-limited subframe cluster; or the terminal side detecting the control channel only on the subframes outside the detection-limited subframe cluster; or the terminal side not detecting the control channel on the subframes inside the detection-limited subframe cluster.

The step of a terminal detecting the control channel according to the determined manner comprises:

the terminal side detecting the control channel on all MBSFN subframes according to an extended CP length; or the terminal side blindly detecting the ePDCCH on subframes outside the detection-limited subframe cluster according to an extended CP length.

The method further comprises:

the terminal side receiving one or more of the following information:

PMCH transmission subframe configuration, configuration of a PRS subframe only transmitted on the MBSFN subframe, CP length configuration of the subframe 0, configuration of a PRS subframe only transmitted on the MBSFN subframes when the subframe 0 is of a normal CP length, MBSFN subframe configuration, special subframe configuration of a TDD system, and CSI-RS subframe configuration.

the public high-layer signaling includes: a master information block and a system information block.

The present document further discloses a base station, comprising:

a first module, set to configure for a terminal side detection-limited subframe cluster information of a control channel, so as to notify the terminal side of a manner by which the base station side transmits the control channel;

a second module, set to transmit the control channel to the terminal side;

wherein, the second module is set to:

transmit the control channel only on subframes outside the detection-limited subframe cluster; or transmit the control channel through at least one or a combination of a plurality of the following manners:

the control channel is transmitted respectively in a control channel region independently configured for the subframes inside the detection-limited subframe cluster and in a control channel region independently configured for the subframes outside the detection-limited subframe cluster;

the control channel is transmitted on the subframes inside the detection-limited subframe cluster according to a subframe Cyclic Prefix (CP) length configured in the detection-limited subframe cluster;

the control channel is transmitted respectively in the range of a detection aggregation level independently configured for subframes inside the detection-limited subframe cluster and in the range of a detection aggregation level independently configured for subframes outside the detection-limited subframe cluster;

the control channel is transmitted respectively on various parameters of detection control channel elements or detection resource units or enhanced resource element groups or resource element groups independently configured for subframes inside the detection-limited subframe cluster and on various parameters of detection control channel elements or detection resource units or enhanced resource element groups or resource element groups independently configured for subframes outside the detection-limited subframe cluster, wherein, the various parameters of detection control channel elements or detection resource units or enhanced resource element groups or resource element groups at least include one or more of the following: a size, a detection interval, a detection initial location, and a detection range;

the control channel is transmitted according to a detection Downlink Control Information (DCI) format type independently configured for subframes inside the detection-limited subframe cluster and according to a detection DCI format type independently configured for subframes outside the detection-limited subframe cluster;

the control channel is transmitted according to a number of candidate detection sets configured independently for subframes inside the detection-limited subframe cluster and according to a number of candidate detection sets configured independently for subframes outside the detection-limited subframe cluster;

the control channel is transmitted on a detection carrier independently configured for subframes inside the detection-limited subframe cluster and on a detection carrier independently configured for subframes outside the detection-limited subframe cluster;

the control channel at least includes one or more of the following: an Enhanced Physical Downlink Control Channel (ePDCCH), an Enhanced Physical Hybrid ARQ Indicator Channel (ePHICH) and an Enhanced Channel Signaling System (eCSS).

The control channel regions, the subframe CP length, the range of the detection cluster level, the various parameters of detection control channel elements or detection resource units or enhanced resource element groups or resource element groups, the detection DCI format type, the number of candidate detection sets and the detection carrier independently configured for the subframes inside the detection-limited subframe cluster and the subframes outside the detection-limited subframe cluster are agreed on by the base station side and the terminal side in advance, or are configured for the terminal side by the base station side through dedicated or public high-layer signaling.

The first module is set to configure the detection-limited subframe cluster information of the control channel for the terminal side at least through one or more of the following manners:

configuring through Physical Multicast Channel (PMCH) transmission subframe configuration, through configuration a Positioning Reference Signal (PRS) subframe only transmitted on the Multicast Broadcast Single Frequency Network (MBSFN) subframe, through configuration of a PRS subframe configuration only transmitted on the MBSFN subframes when the subframe 0 is of a normal CP length, through the MBSFN subframe configuration, through special subframe configuration of a Time Division Duplex (TDD) system, through the Channel Statement Information Reference Signal (CSI-RS) subframe configuration, and through the dedicated high-layer signaling configuration.

The first module is set to, when configuring the detection-limited subframe cluster information of the control channel through the dedicated higher-layer signaling, notify the terminal side of the detection-limited subframe cluster information of the control channel using a bitmap sequence, wherein, each bit in the bitmap sequence represents one subframe or resource block; or notify the terminal side of the detection-limited subframe cluster information of the control channel in a notification way of using a bitmap sequence and periodic configuration in conjunction with subframe offset configuration.

The bitmap sequence is of 6 bits or 10 bits or 40 bits or 24 bits.

The first module is set to notify the terminal side of the detection-limited subframe cluster information of the control channel through a subframe offset index and periodic configuration in combination with encoding when configuring for a terminal side the detection-limited subframe cluster information of a control channel.

The first module is set to, when configuring for a terminal side the detection-limited subframe cluster information of a control channel, independently configure for the terminal side the detection-limited subframe cluster information of ePDCCH and ePHICH respectively; or independently configure the detection-limited subframe cluster information of ePDCCH and eCSS respectively, and uniformly configure the detection-limited subframe cluster information of the ePDCCH and ePHICH for the terminal side; or uniformly configure for the terminal side the detection-limited subframe cluster information of the ePDCCH, PHICH and eCSS.

The base station further comprises a third module, set to configure for the terminal side one or more of the following information:

PMCH transmission subframe configuration, configuration of the PRS subframe only transmitted on the MBSFN subframe, CP length configuration of the subframe 0, configuration of the PRS subframe only transmitted on the MBSFN subframes when the subframe 0 is of a normal CP length, MBSFN subframe configuration, special subframe configuration of a TDD system, CSI-RS subframe configuration.

The present document further discloses a terminal, comprising:

a first module, set to receive the detection-limited subframe cluster information of a control channel configured by a base station side, and determine a manner by which the control channel is detected according to the detection-limited subframe cluster information;

a second module, set to detect the control channel according to the manner determined by the first module;

wherein, the manner by which the control channel is detected by the second module is that the control channel is only detected on subframes outside the detection-limited subframe cluster; or the control channel is detected according to at least one or a combination of a plurality of the following manners:

the control channel is detected respectively according to a control channel region independently configured for the subframes inside the detection-limited subframe cluster on the subframes inside the detection-limited subframe cluster and according to a control channel region independently configured for the subframes outside the limited subframe cluster on the subframes outside the limited subframe cluster;

the control channel is detected on the subframes inside the detection-limited subframe cluster according to a subframe Cyclic Prefix (CP) length configured in the detection-limited subframe cluster;

the control channel is detected respectively according to the range of a detection aggregation level independently configured for subframes inside the detection-limited subframe cluster on the subframes inside the detection-limited subframe cluster and according to the range of a detection aggregation level independently configured for subframes outside the detection-limited subframe cluster on the subframes outside the detection-limited subframe cluster;

the control channel is detected respectively according to various parameters of detection control channel elements or detection resource units or enhanced resource element groups or resource element groups independently configured for subframes inside the detection-limited subframe cluster on the subframes inside the detection-limited subframe cluster and according to various parameters of detection control channel elements or detection resource units or enhanced resource element groups or resource element groups independently configured for subframes outside the detection-limited subframe cluster on the subframes outside the detection-limited subframe cluster, wherein, the various parameters of detection control channel elements or detection resource units or enhanced resource element groups or resource element groups include one or more of the following: a size, a detection interval, a detection initial location, and a detection range;

the control channel is detected according to a detection Downlink Control Information (DCI) format type independently configured for subframes inside the detection-limited subframe cluster on the subframes inside the detection-limited subframe cluster and according to a detection DCI format type independently configured for subframes outside the detection-limited subframe cluster on the subframes outside the detection-limited subframe cluster; and the control channel is detected according to a number of candidate detection sets configured independently for subframes inside the detection-limited subframe cluster on the subframes inside the detection-limited subframe cluster and according to a number of candidate detection sets configured independently for subframes outside the detection-limited subframe cluster on the subframes outside the detection-limited subframe cluster;

the control channel is detected on a detection carrier independently configured for subframes inside the detection-limited subframe cluster and on a detection carrier independently configured for subframes outside the detection-limited subframe cluster;

the control channel at least includes one or more of the following:

an Enhanced Physical Downlink Control Channel (ePDCCH), an Enhanced Physical Hybrid ARQ Indicator Channel (ePHICH) and an Enhanced Channel Signaling System (eCSS).

The control channel regions, the subframe CP length, the range of the detection cluster level, the various parameters of detection control channel elements or detection resource units or enhanced resource element groups or resource element groups, the detection DCI format type, the number of candidate detection sets and the detection carrier independently configured for the subframes inside the detection-limited subframe cluster and the subframes outside the detection-limited subframe cluster are agreed on by the terminal side and the base station side in advance, or are received by the terminal side through dedicated high-layer signaling, or are received by the terminal side through public high-layer signaling.

The first module is set to receive the detection-limited subframe cluster information of the control channel configured by the base station side at least through one or more of the following manners:

receiving through Physical Multicast Channel (PMCH) transmission subframe configuration information, through configuration information of a Positioning Reference Signal (PRS) subframe only transmitted on the Multicast Broadcast Single Frequency Network (MBSFN) subframe, through CP length configuration information of subframe 0, through configuration information of a PRS subframe only transmitted on the MBSFN subframes when the subframe 0 is of a normal CP length, through the MBSFN subframe configuration information, through special subframe configuration information of a Time Division Duplex (TDD) system, through the Channel Statement Information Reference Signal (CSI-RS) subframe configuration information, and through the dedicated high-layer signaling configuration information.

The first module is set to receive the detection-limited subframe cluster information of the control channel by a bitmap sequence when receiving the detection-limited subframe cluster information of the control channel configured by the base station side through the dedicated higher-layer signaling, wherein, each bit in the bitmap sequence represents one subframe or resource block.

The first module is set to receive the detection-limited subframe cluster information of the control channel by a way of using a bitmap sequence and periodic configuration in conjunction with subframe offset configuration when receiving the detection-limited subframe cluster information of the control channel configured by the base station side through the dedicated higher-layer signaling.

The bitmap sequence is of 6 bits or 10 bits or 40 bits or 24 bits.

The first module is set to receive the detection-limited subframe cluster information of the control channel through a subframe offset index and periodic configuration in combination with encoding.

The first module is set to independently receive the detection-limited subframe cluster information of ePDCCH and ePHICH respectively.

The first module is set to independently receive the detection-limited subframe cluster information of ePDCCH and eCSS respectively, and uniformly receive the detection-limited subframe cluster information of the ePDCCH and ePHICH.

The first module is set to uniformly receive the detection-limited subframe cluster information of the ePDCCH, PHICH and eCSS.

The second module is set to detect the control channel by the following manner:

when a CP configuration length of the subframe 0 is a normal CP length, detecting the control channel on all MBSFN subframes according to an extended CP length; or blindly detecting the ePDCCH on the subframes inside the detection-limited subframe cluster according to an extended CP length; or detecting the control channel in the PDCCH region and PDSCH region of all MBSFN subframes; or using a normal CP length and an extended CP length as candidate lengths for detecting the control channel in the PDSCH region of all MBSFN subframes, if a target control channel is detected according to one length therein, not detecting with respect to another length again; or detecting the control channel in the PDCCH region of all MBSFN subframes; or detecting the control channel in the PDCCH region of the subframes inside the detection-limited subframe cluster; or only detecting the control channel on the subframes outside the detection-limited subframe cluster; or not detecting the control channel on the subframes inside the detection-limited subframe cluster.

The second module is set to detect the control channel by the following manner:

detecting the control channel on all MBSFN subframes according to an extended CP length; or blindly detecting the ePDCCH on subframes outside the detection-limited subframe cluster according to an extended CP length.

The terminal further comprises a third module, set to receive one or more of the following information:

PMCH transmission subframe configuration, configuration of the PRS subframe only transmitted on the MBSFN subframe, CP length configuration of the subframe 0, configuration of the PRS subframe only transmitted on the MBSFN subframes when the subframe 0 is of a normal CP length, MBSFN subframe configuration, special subframe configuration of a TDD system and CSI-RS subframe configuration.

The public high-layer signaling includes: a master information block and a system information block.

With the technology of the present application, it is to avoid problems, such as false detection etc., when the ePDCCH, ePHICH, eCSS and PMCH subframes or PRS subframes only configured to be transmitted on MBSFN subframes collide, or resulting in that the subframes configured with excessive CSI-RS resources make available resource elements less, such that both the base station side and the terminal side can properly transmit and receive related control channels, thus avoiding the complexity of blind detection by the terminal side.

Wherein, the parameters described herein of detection control channel elements or detection resource units or enhanced resource element groups or resource element groups include one or more of the following: a size, a detection interval, a detection initial location, and a detection range, wherein, the size refers to the number of resource elements contained in the above elements or element groups; the detection interval refers to a detection being performed by the terminal side every two or more elements or element groups; the detection initial location refers to an initial location of the element or element group at which each terminal starts to detecte; and the detection range refers to the number of elements or element groups needed to be detected or the maximum number of elements or element groups needed to be detected.

Wherein, the base station side described herein transmitting the control channel can also be referred to as the base station side transferring the control channel or the base station side mapping a control channel to be related to the control channel etc. The description thereof does not limit the concept of the present document.

PREFERRED EMBODIMENTS OF THE INVENTION

The technical solution of the present document will be further described in detail in conjunction with accompanying drawings hereinafter. It should be illustrated that the embodiments in the present application and features in the embodiments can be randomly combined with each other without conflict.

Embodiment One

The present embodiment introduces a method for transmitting a control channel, comprising:

a base station side configuring, for a terminal side, detection-limited subframe cluster information of a control channel, so as to notify the terminal side of a manner by which the base station side transmits the control channel;

wherein, the manner by which the base station side transmits the control channel is that the control channel is only transmitted on subframes outside the detection-limited subframe cluster; or the manner by which the base station side transmits the control channel is at least one or a combination of a plurality of the following manners:

the control channel is transmitted respectively in a detection control channel region independently configured for the subframes inside the detection-limited subframe cluster or in a detection control channel region independently configured for the subframes outside the detection-limited subframe cluster;

the control channel is transmitted on the subframes inside the detection-limited subframe cluster according to a subframe Cyclic Prefix (CP) length configured in the detection-limited subframe cluster;

the control channel is transmitted respectively in the range of a detection aggregation level independently configured for subframes inside the detection-limited subframe cluster and in the range of a detection aggregation level independently configured for subframes outside the detection-limited subframe cluster; wherein, the range of detection aggregation level refers to a range constituted by a size of the configured detection aggregation level. It can also be construed as a size and/or range of the configured detection aggregation level.

The control channel is transmitted respectively on various parameters of detection Control Channel Elements (CCEs) or detection resource units or an enhanced resource element group or a resource element group independently configured for subframes inside the detection-limited subframe cluster and on various parameters of detection control channel elements or detection resource units or an enhanced resource element group or a resource element group independently configured for subframes outside the detection-limited subframe cluster, wherein, the parameters of detection control channel elements or detection resource units or an enhanced resource element group or a resource element group at least include one or more of the following: a size, a detection interval, a detection initial location, and a detection range;

the control channel is transmitted according to a detection Downlink Control Information (DCI) format type independently configured for subframes inside the detection-limited subframe cluster and according to a detection DCI format type independently configured for subframes outside the detection-limited subframe cluster, wherein, the detection DCI format type is a configured detection DCI format type, and the configured type may be one or more types. Therefore, the configured detection DCI format type can also be construed as the detection DCI format type and/or range.

The control channel is transmitted according to the number of candidate detection sets configured independently for subframes inside the detection-limited subframe cluster and according to the number of candidate detection sets configured independently for subframes outside the detection-limited subframe cluster; wherein, the number of detection candidate sets can also be contruted as a kind of range. Therefore, the number of detection candidate sets can also be construed as the number and/or range of detection candidate sets.

The control channel is transmitted on a detection carrier independently configured for subframes inside the detection-limited subframe cluster and on a detection carrier independently configured for subframes outside the detection-limited subframe cluster;

the control channel at least includes one or more of the following:

an Enhanced Physical Downlink Control Channel (ePDCCH), an Enhanced Physical Hybrid ARQ Indicator Channel (ePHICH) and an Enhanced Channel Signaling System (eCSS).

Wherein, the control channel regions, the subframe CP length, the range of the detection cluster level, the various parameters of detection control channel elements or detection resource units or an enhanced resource element group or a resource element group, the detection DCI format type, the number of candidate detection sets and the detection carrier, which are described above, independently configured for the subframes inside the detection-limited subframe cluster and the subframes outside the detection-limited subframe cluster are agreed on by the base station side and the terminal side in advance, or are configured for the terminal side by the base station side through dedicated or public high-layer signaling. The public high-layer signaling here can include: a master information block and a system information block.

Specifically, the above base station side can configure the detection-limited subframe cluster information of the control channel for the terminal side at least through one or more of the following manners:

configuring through Physical Multicast Channel (PMCH) transmission subframe configuration, through configuration of a Positioning reference signal (PRS) subframe only transmitted on the Multicast Broadcast Single Frequency Network (MBSFN) subframe, through configuration of a PRS subframe only transmitted on the MBSFN subframes when the subframe 0 is of a normal CP length, through the MBSFN subframe configuration, through special subframe configuration of a Time Division Duplex (TDD) system, through the Channel Statement Information Reference Signal (CSI-RS) subframe configuration, and through the dedicated high-layer signaling configuration.

It should be illustrated that, the base station side can notify the terminal side of the detection-limited subframe cluster information of the control channel using a bitmap sequence when configuring the detection-limited subframe cluster information of the control channel through the dedicated higher-layer signaling, wherein, each bit in the bitmap represents one subframe or resource block. Alternatively, the base station side can notify the terminal side of the detection-limited subframe cluster information of the control channel in a notification way of using a bitmap sequence and periodic configuration in combination with subframe offset configuration when configuring the detection-limited subframe cluster information of the control channel through the dedicated higher-layer signaling. Wherein, the bitmap sequence is of 6 bits or 10 bits or 40 bits or 24 bits.

In addition, when a base station side configures for a terminal side the detection-limited subframe cluster information of a control channel, it can further notify the terminal side of the detection-limited subframe cluster information of the control channel through a subframe offset index and periodic configuration in combination with encoding.

In the present embodiment, in the process of a base station side configuring for a terminal side the detection-limited subframe cluster information of a control channel, the base station side can independently configure for the terminal side the detection-limited subframe cluster information of ePDCCH and ePHICH respectively (i.e., notifying the terminal side of the configured detection-limited subframe cluster information of ePDCCH and ePHICH respectively). Alternatively, the base station side independently configures the detection-limited subframe cluster information of ePDCCH and eCSS respectively, and uniformly configures the detection-limited subframe cluster information of the ePDCCH and ePHICH for the terminal side (i.e., notifying the terminal side of the configured detection-limited subframe cluster information of ePDCCH and eCSS respectively, while notifying the terminal side of the detection-limited subframe cluster information of the ePDCCH and ePHICH all at once). Alternatively, the base station side uniformly configures for the terminal side the detection-limited subframe cluster information of the ePDCCH, PHICH and eCSS (i.e., notifying the terminal side of the detection-limited subframe cluster information of the ePDCCH, PHICH and eCSS all at once).

It should be illustrated that based on the above method, the base station side will further transmit one or more of the following information to all terminals (the all terminals include terminals which can receive the following information in the prior art and terminals which can not receive the following information in the prior art):

PMCH transmission subframe configuration, configuration of the PRS subframe only transmitted on the MBSFN subframe, CP length configuration of the subframe 0, configuration of the PRS subframe only transmitted on the MBSFN subframes when the subframe 0 is of a normal CP length, MBSFN subframe configuration, special subframe configuration of a TDD system, CSI-RS subframe configuration.

Embodiment Two

The present embodiment introduces a method for receiving a control channel, comprising:

a terminal side receiving the detection-limited subframe cluster information of a control channel configured by a network side, determining a manner by which the control channel is detected according to the detection-limited subframe cluster information, and detecting the control channel according to the determined manner (detecting the control channel can also be referred to as receiving the control channel);

wherein, the manner by which the control channel is detected by the terminal side is that the control channel is only detected on subframes outside the detection-limited subframe cluster; or the control channel is detected according to at least one or a combination of a plurality of the following manners:

the control channel is detected respectively according to a control channel region independently configured for the subframes inside the detection-limited subframe cluster on the subframes inside the detection-limited subframe cluster and according to a control channel region independently configured for the subframes outside the limited subframe cluster on the subframes outside the limited subframe cluster;

the control channel is detected on the subframes inside the detection-limited subframe cluster according to a subframe CP length configured in the detection-limited subframe cluster;

the control channel is detected respectively according to a range of a detection aggregation level independently configured for subframes inside the detection-limited subframe cluster on the subframes inside the detection-limited subframe cluster and according to a range of a detection aggregation level independently configured for subframes outside the detection-limited subframe cluster on the subframes outside the detection-limited subframe cluster, wherein, the range of detection aggregation level refers to a range constituted by a size of the configured detection aggregation level. It can also be construed as a size and/or range of the configured detection aggregation level.

The control channel is detected respectively according to various parameters of detection control channel elements or detection resource units or an enhanced resource element group or a resource element group independently configured for subframes inside the detection-limited subframe cluster on the subframes inside the detection-limited subframe cluster and according to various parameters of detection control channel elements or detection resource units or an enhanced resource element group or a resource element group independently configured for subframes outside the detection-limited subframe cluster on the subframes outside the detection-limited subframe cluster, wherein, the parameters of detection control channel elements or detection resource units or an enhanced resource element group or a resource element group include one or more of the following: a size, a detection interval, a detection initial location, and a detection range;

the control channel is detected according to a detection DCI format type independently configured for subframes inside the detection-limited subframe cluster on the subframes inside the detection-limited subframe cluster and according to a detection DCI format type independently configured for subframes outside the detection-limited subframe cluster on the subframes outside the detection-limited subframe cluster, wherein, the detection DCI format type is a configured detection DCI format type, and the configured type may be one or more types. Therefore, the configured detection DCI format type can also be construed as the detection DCI format type and/or range.

The control channel is detected according to the number of candidate detection sets configured independently for subframes inside the detection-limited subframe cluster on the subframes inside the detection-limited subframe cluster and according to the number of candidate detection sets configured independently for subframes outside the detection-limited subframe cluster on the subframes outside the detection-limited subframe cluster, wherein, the number of the detection candidate sets can also be construed as a kind of range. Therefore, the number of detection candidate sets can also be construed as the number and/or range of detection candidate sets.

The control channel is detected on a detection carrier independently configured for subframes inside the detection-limited subframe cluster and on a detection carrier independently configured for subframes outside the detection-limited subframe cluster;

the control channel at least includes one or more of the following:

ePDCCH, ePHICH, eCSS.

Wherein, the control channel regions, the subframe CP length, the range of the detection cluster level, the various parameters of detection control channel elements or detection resource units or an enhanced resource element group or a resource element group, the detection DCI format type, the number of candidate detection sets and the detection carrier described above independently configured for the subframes inside the detection-limited subframe cluster and the subframes outside the detection-limited subframe cluster are agreed on by the terminal side and the base station side in advance, or are received by the terminal side through dedicated high-layer signaling, or are received by the terminal side through public high-layer signaling. The public high-layer signaling here can include: a Master Information Block (MIB) and a System Information Block (SIBx, x>0).

Specifically, the terminal side above can receive the detection-limited subframe cluster information of the control channel configured by the base station side at least through one or more of the following manners:

receiving through PMCH transmission subframe configuration information, through configuration information of the PRS subframe only transmitted on the MBSFN subframe, through the CP length configuration information of subframe 0, through configuration information of the PRS subframe only transmitted on the MBSFN subframes when the subframe 0 is of a normal CP length, through the MBSFN subframe configuration information, through special subframe configuration information of a TDD system, through the CSI-RS subframe configuration information, and through the dedicated high-layer signaling configuration information.

It should be illustrated that the terminal side can receive the detection-limited subframe cluster information of the control channel by a bitmap sequence when receiving the detection-limited subframe cluster information of the control channel configured by the base station side through the dedicated higher-layer signaling, wherein, each bit in the bitmap represents one subframe or resource block. Alternatively, the terminal side receives the detection-limited subframe cluster information of the control channel by a way of using a bitmap sequence and periodic configuration in combination with subframe offset configuration. Wherein, the bitmap sequence is of 6 bits or 10 bits or 40 bits or 24 bits.

In addition, in the process of a terminal side receiving the detection-limited subframe cluster information of the control channel configured by the base station side, the terminal side can receive the detection-limited subframe cluster information of the control channel through a subframe offset index and periodic configuration in combination with encoding.

In the present embodiment, there are a variety of manners for a terminal side receiving the detection-limited subframe cluster information of a control channel configured by the base station side. For example, the terminal side can independently receive the detection-limited subframe cluster information of ePDCCH and ePHICH respectively. Alternatively, the terminal side can independently receive the detection-limited subframe cluster information of ePDCCH and eCSS respectively, and uniformly receive the detection-limited subframe cluster information of the ePDCCH and ePHICH. Alternatively, the terminal side uniformly receives the detection-limited subframe cluster information of the ePDCCH, PHICH and eCSS.

In the preferable solution, for the scene that a CP configuration length of the subframe 0 is a normal CP length, the terminal side can detect the control channel on all MBSFN subframes according to an extended CP length. Alternatively, the terminal side blindly detects the ePDCCH on the subframes inside the detection-limited subframe cluster according to an extended CP length. Alternatively, the terminal side detects the control channel in the PDCCH region and PDSCH region of all MBSFN subframes. Alternatively, the terminal side uses a normal CP length and an extended CP length as candidate lengths for detecting the control channel in the PDSCH region of all MBSFN subframes, and if a target control channel is detected according to one length therein, the terminal side does not detect with respect to another length again. Alternatively, the terminal side detects the control channel in the PDCCH region of all MBSFN subframes. Alternatively, the terminal side detects the control channel in the PDCCH region of the subframes inside the detection-limited subframe cluster. Alternatively, the terminal side only detects the control channel on the subframes outside the detection-limited subframe cluster. Alternatively, the terminal side does not detect the control channel on the subframes inside the detection-limited subframe cluster.

In some other solutions, the terminal side detects the control channel on all MBSFN subframes according to an extended CP length. Alternatively, the terminal side blindly detects the ePDCCH on subframes outside the detection-limited subframe cluster according to an extended CP length. Alternatively, the terminal side detects the control channel in the PDCCH region and PDSCH region of all MBSFN subframes. Alternatively, the terminal side detects the control channel in the PDCCH region of all MBSFN subframes. Alternatively, the terminal side uses a normal CP length and an extended CP length as candidate lengths for detecting the control channel in the PDSCH region of all MBSFN subframes, and if a target control channel is detected according to one length therein, the terminal side does not detect with respect to another length again. Alternatively, the terminal side detects the control channel in the PDCCH region of the subframes inside the detection-limited subframe cluster.

Based on the above method, the terminal side will further receive one or more of the following information, and it should be illustrated that the terminals for receiving the following information here include terminals which can receive the following information in the prior art and terminals which can not receive the following information in the prior art:

PMCH transmission subframe configuration, configuration of the PRS subframe only transmitted on the MBSFN subframe, CP length configuration of the subframe 0, configuration of the PRS subframe only transmitted on the MBSFN subframes when the subframe 0 is of a normal CP length, MBSFN subframe configuration, special subframe configuration of a TDD system, CSI-RS subframe configuration.

The specific implementation of the method introduced by the above embodiment one and embodiment two will be described below in conjunction with specific application scenes. It should be illustrated that, the detection-limited subframe cluster information herein is only for the purpose of illustrating that there is a consistent stipulation between the base station side and the terminal side i.e., a certain manner is used on these subframes to transmit and receive ePDCCH, ePHICH or eCSS, but the present document is not limited to such a description manner of "detection-limited subframe cluster information".

Scene One:

Assuming that UE1 is a terminal of R11 or a terminal of a higher version, the base station side notifies the terminal side of the detection-limited subframe cluster information through PMCH transmission subframe configuration and/or configuration of a PRS subframe only transmitted on the MBSFN subframes. The base station side does not transmit the ePDCCH of the UE1 on the subframes inside the detection-limited subframe cluster.

The UE1 obtains the PMCH transmission subframe configuration and/or configuration of the PRS subframe only transmitted on the MBSFN subframes by receiving the signaling transmitted by the base station side, thus obtaining the detection-limited subframe cluster information, and at this time, the UE1 does not detect and receive the ePDCCH on the subframes of the detection-limited subframe cluster.

Scene Two:

Assuming that UE1 is a terminal of R11 or a terminal of a higher version, the base station side notifies the terminal side of the detection-limited subframe cluster information through PMCH transmission subframe configuration and/or configuration of a PRS subframe only transmitted on the MBSFN subframes. The base station side does not transmit the ePHICH of the UE1 on the subframes inside the detection-limited subframe cluster.

The UE1 obtains the PMCH transmission subframe configuration and/or configuration of a the PRS subframe only transmitted on the MBSFN subframes by receiving the signaling transmitted by the base station side, thus obtaining the detection-limited subframe cluster information, and at this time, the UE1 does not detect and receive the ePHICH on the subframes of the detection-limited subframe cluster.

Scene Three:

Assuming that UE1 is a terminal of R11 or a terminal of a higher version, the base station side notifies the terminal side of the detection-limited subframe cluster information through PMCH transmission subframe configuration and/or configuration of a PRS subframe only transmitted on the MBSFN subframes. The base station side does not transmit the eCSS of the UE1 on the subframes of the detection-limited subframe cluster.

The UE1 obtains the PMCH transmission subframe configuration and/or configuration of the PRS subframe only transmitted on the MBSFN subframes by receiving the signaling transmitted by the base station side, thus obtaining the detection-limited subframe cluster information, and at this time, the UE1 does not detect and receive the eCSS on the subframes inside the detection-limited subframe cluster.

Scene Four:

Assuming that UE1 is a terminal of R11 or a terminal of a higher version, the base station side notifies the terminal side of the detection-limited subframe cluster through PMCH transmission subframe configuration and/or configuration of a PRS subframe only transmitted on the MBSFN subframes.

The base station side does not transmit the ePDCCH of the UE1 on the subframes of the detection-limited subframe cluster.

The UE1 obtains the PMCH transmission subframe configuration and/or configuration of the PRS subframe only transmitted on the MBSFN subframes by receiving the signaling transmitted by the base station side, and the UE1 does not detect and receive the ePDCCH and/or ePHICH and/or eCSS on these subframes.

Scene Five:

Assuming that UE1 is a terminal of R11 or a terminal of a higher version, the base station side notifies the terminal side of the detection-limited subframe cluster through PMCH transmission subframe configuration and/or configuration of a PRS subframe only transmitted on the MBSFN subframes. The base station side does not transmit the ePDCCH of the UE1 in the PDSCH region on the subframes of the detection-limited subframe cluster, and transmits downlink/uplink control signaling related to UE1 in the PDCCH region or non-PDSCH region in the subframes.

The UE1 obtains the PMCH transmission subframe configuration and/or configuration of the PRS subframe only transmitted on the MBSFN subframes by receiving the signaling transmitted by the base station side, thus obtaining the detection-limited subframe cluster, and the UE1 does not detect and receive the ePDCCH in the PDSCH region on the subframes of the detection-limited subframe cluster, and instead, detects and receives the related downlink and/or uplink control signaling or PDCCH in the PDCCH region or the non-PDSCH region in the subframes.

Scene Six:

Assuming that UE1 is a terminal of R11 or a terminal of a higher version, the base station side notifies the terminal side of the detection-limited subframe cluster information through PMCH transmission subframe configuration and/or configuration of a PRS subframe only transmitted on the MBSFN subframes. The base station side does not transmit the ePHICH of the UE1 in the PDSCH region on the subframes of the detection-limited subframe cluster, and transmits the PHICH control signaling related to UE1 in the non-PDSCH region in the subframes or in a traditional PHICH region.

The UE1 obtains the PMCH transmission subframe configuration and/or configuration of the PRS subframe only transmitted on the MBSFN subframes by receiving the signaling transmitted by the base station side, thus obtaining detection-limited subframe cluster, and the UE1 does not detect and receive the ePHICH in the PDSCH region on the subframes of the detection-limited subframe cluster, and instead, receives the PHICH in the non-PDSCH region or in the traditional PHICH region.

Scene Seven:

Assuming that UE1 is a terminal of R11 or a terminal of a higher version, the base station side notifies the terminal side of the detection-limited subframe cluster through PMCH transmission subframe configuration and/or configuration of a PRS subframe only transmitted on the MBSFN subframes. The base station side does not transmit the eCSS-related control signaling of the UE1 in the PDSCH region on the subframes of the detection-limited subframe cluster, and transmits the eCSS-related control signaling of the UE1 in the non-PDSCH region in the subframes or in a traditional CSS region.

The UE1 obtains the PMCH transmission subframe configuration and/or configuration of the PRS subframe only transmitted on the MBSFN subframes by receiving the signaling transmitted by the base station side, thus obtaining detection-limited subframe cluster, and the UE1 does not detect and receive the eCSS-related control signaling in the PDSCH region on the subframes of the detection-limited subframe cluster, and instead, detects and receives the CSS-related control signaling in the non-PDSCH region or in the traditional CSS region.

Scene Eight:

Assuming that UE1 is a terminal of R11 or a terminal of a higher version, the base station side notifies the terminal side of the detection-limited subframe cluster through PMCH transmission subframe configuration and/or configuration of a PRS subframe only transmitted on the MBSFN subframes. The base station side transmits the ePDCCH and/or ePHICH and/or eCSS-related control signaling according to an extended CP on the subframes of the detection-limited subframe cluster.

The UE1 obtains the PMCH transmission subframe configuration and/or configuration of the PRS subframe only transmitted on the MBSFN subframes by receiving the signaling transmitted by the base station side, thus obtaining detection-limited subframe cluster, and the UE1 receives the ePDCCH and/or ePHICH and/or eCSS-related control signaling using the extended CP on the subframes of the detection-limited subframe cluster.

Scene Nine:

Assuming that UE1 is a terminal of R11 or a terminal of a higher version, the base station side notifies the terminal side of the first detection-limited subframe cluster through PMCH transmission subframe configuration. The base station side does not transmit the ePDCCH in the PDSCH region on the subframes of the first detection-limited subframe cluster or transmits the downlink or uplink control signaling of the UE1 in the PDCCH region. The base station terminal notifies the terminal side of the second detection-limited subframe cluster through configuration of the PRS subframe only transmitted on the MBSFN subframes. The base station side transmits the ePDCCH using the extended CP on the subframes of the second detection-limited subframe cluster.

The UE1 obtains the PMCH transmission subframe configuration by receiving the high-layer signaling transmitted by the base station side, thus obtaining the first detection-limited subframe cluster. The terminal side does not receive the ePDCCH in the PDSCH region on the subframes of the first detection-limited subframe cluster or receives the downlink or uplink control signaling of the UE1 in the PDCCH region. The UE1 obtains the configuration of the PRS subframe only transmitted on the MBSFN subframes by receiving the high-layer signaling transmitted by the base station side, thus obtaining the second detection-limited subframe cluster, and the UE1 receives the ePDCCH using the extended CP on the subframes of the second detection-limited subframe cluster.

Scene Ten:

Assuming that UE1 is a terminal of R11 or a terminal of a higher version, the base station side notifies the terminal side of the first detection-limited subframe cluster through PMCH transmission subframe configuration. The base station side does not transmit the ePDCCH in the PDSCH region on the subframes of the first detection-limited subframe cluster or transmits the PHICH-related signaling of the UE1 in the PHICH region or in the non-PDCCH region. The base station side notifies the terminal side of the second detection-limited subframe cluster through the configuration of the PRS subframe only transmitted on the MBSFN subframes. The base station side transmits the ePHICH in the PDSCH region using the extended CP on the subframes of the second detection-limited subframe cluster.

The UE1 obtains the PMCH transmission subframe configuration by receiving the high-layer signaling transmitted by the base station side, thus obtaining the first detection-limited subframe cluster. The terminal side does not receive the ePHICH in the PDSCH region on the subframes of the first detection-limited subframe cluster or receives the PHICH control signaling of the UE1 in the PHICH region or the non-PDSCH region. The UE1 obtains the configuration of the PRS subframe only transmitted on the MBSFN subframes by receiving the high-layer signaling transmitted by the base station side, thus obtaining the second detection-limited subframe cluster, and the UE1 receives the ePHICH in the PDSCH region using the extended CP on the subframes of the second detection-limited subframe cluster.

Scene Eleven:

Assuming that UE1 is a terminal of R11 or a terminal of a higher version, the base station side notifies the terminal side of the first detection-limited subframe cluster through PMCH transmission subframe configuration. The base station side does not transmit the eCSS in the PDSCH region on the subframes of the first detection-limited subframe cluster or transmits the CSS-related signaling of the UE1 in the CSS region or in the non-PDCCH region. The base station side notifies the terminal side of the second detection-limited subframe cluster through the configuration of the PRS subframe only transmitted on the MBSFN subframes. The base station side transmits the eCSS control signaling in the PDSCH region using the extended CP on the subframes of the second detection-limited subframe cluster.

The UE1 obtains the PMCH transmission subframe configuration by receiving the high-layer signaling transmitted by the base station side, thus obtaining the first detection-limited subframe cluster. The terminal side does not receive the eCSS in the PDSCH region on the subframes of the first detection-limited subframe cluster or receives the CSS control signaling of the UE1 in the CSS region or the non-PDSCH region. The UE1 obtains the configuration of the PRS subframe only transmitted on the MBSFN subframes by receiving the high-layer signaling transmitted by the base station side, thus obtaining the second detection-limited subframe cluster, and the UE1 receives the eCSS control signaling in the PDSCH region using the extended CP on the subframes of the second detection-limited subframe cluster.

Scene Twelve:

Assuming that UE1 is a terminal of R11 or a terminal of a higher version, the base station side notifies the terminal side of the detection-limited subframe cluster through dedicated high-layer signaling for the terminal. The base station side does not transmit the ePDCCH in the PDSCH region on the subframes of the detection-limited subframe cluster or transmits the downlink or uplink control signaling of the UE1 in the PDCCH region.

The UE1 obtains the detection-limited subframe cluster of the terminal side by receiving the dedicated high-layer signaling for the terminal transmitted by the base station side, and the UE1 does not receive the ePDCCH in the PDSCH region on the subframes of the detection-limited subframe cluster or receives the downlink or uplink control signaling of the UE1 in the PDCCH region.

Scene Thirteen:

Assuming that UE1 is a terminal of R11 or a terminal of a higher version, the base station side notifies the terminal side of the detection-limited subframe cluster through dedicated high-layer signaling for the terminal. The base station side does not transmit the ePHICH in the PDSCH region on the subframes of the detection-limited subframe cluster or transmits the PHICH control signaling of the UE1 in the PHICH region or the non-PDSCH region.

The UE1 obtains the detection-limited subframe cluster of the terminal side by receiving the dedicated high-layer signaling for the terminal transmitted by the base station side, and the UE1 does not receive the ePHICH in the PDSCH region on the subframes of the detection-limited subframe cluster or receives the PHICH control signaling of the UE1 in the PHICH region or the non-PDSCH region.

Scene Fourteen:

Assuming that UE1 is a terminal of R11 or a terminal of a higher version, the base station side notifies the terminal side of the detection-limited subframe cluster through dedicated high-layer signaling for the terminal. The base station side does not transmit the eCSS control signaling in the PDSCH region on the subframes of the detection-limited subframe cluster or transmits the CSS control signaling of the UE1 in the CSS region or the non-PDSCH region.

The UE1 obtains the detection-limited subframe cluster of the terminal side by receiving the dedicated high-layer signaling for the terminal transmitted by the base station side, and the UE1 does not receive the eCSS control signaling in the PDSCH region on the subframes of the detection-limited subframe cluster or receives the CSS control signaling of the UE1 in the CSS region or the non-PDSCH region.

Scene Fifteen:

Assuming that UE1 is a terminal of R11 or a terminal of a higher version, the base station side notifies the terminal side of the detection-limited subframe cluster through public high-layer signaling. The base station side does not transmit the ePDCCH in the PDSCH region on the subframes of the detection-limited subframe cluster or transmits the downlink or uplink control signaling of the UE1 in the PDCCH region. Wherein, the related public high-layer signaling can be control signaling of a system message block.

The UE1 obtains the detection-limited subframe cluster of the terminal side by receiving the public high-layer signaling transmitted by the base station side, and the UE1 does not receive the ePDCCH in the PDSCH region on the subframes of the detection-limited subframe cluster or receives the downlink or uplink control signaling of the UE1 in the PDCCH region.

Scene Sixteen:

Assuming that UE1 is a terminal of R11 or a terminal of a higher version, the base station side notifies the terminal side of the detection-limited subframe cluster through public high-layer signaling. The base station side does not transmit the ePHICH in the PDSCH region on the subframes of the detection-limited subframe cluster or transmits the PHICH control signaling of the UE1 in the PHICH region or the non-PDSCH region. Wherein, the related public high-layer signaling can be control signaling of a system message block.

The UE1 obtains the detection-limited subframe cluster of the terminal side by receiving the public high-layer signaling transmitted by the base station side, and the UE1 does not receive the ePHICH in the PDSCH region on the subframes of the detection-limited subframe cluster or receives the PHICH control signaling of the UE1 in the PHICH region or the non-PDSCH region.

Scene Seventeen:

Assuming that UE1 is a terminal of R11 or a terminal of a higher version, the base station side notifies the terminal side of the detection-limited subframe cluster through public high-layer signaling. The base station side does not transmit the eCSS control signaling in the PDSCH region on the subframes of the detection-limited subframe cluster or transmits the CSS control signaling of the UE1 in the CSS region or the non-PDSCH region. Wherein, the related public high-layer signaling can be control signaling of a system message block.

The UE1 obtains the detection-limited subframe cluster of the terminal side by receiving the public high-layer signaling transmitted by the base station side, and the UE1 does not receive the eCSS control signaling in the PDSCH region on the subframes of the detection-limited subframe cluster or receives the CSS control signaling of the UE1 in the CSS region or the non-PDSCH region.

Scene Eighteen:

Assuming that UE1 is a terminal of R11 or a terminal of a higher version, the base station side notifies the terminal side of the first detection-limited subframe cluster and the second detection-limited subframe cluster through dedicated high-layer signaling for the UE or public high-layer signaling. The base station side does not transmit the ePDCCH in the PDSCH region on the subframes of the first detection-limited subframe cluster or transmits the downlink or uplink control signaling of the UE1 in the PDCCH region. The base station side transmits the ePDCCH using an extended CP on the subframes of the second detection-limited subframe cluster.

The UE1 obtains the first detection-limited subframe cluster and the second detection-limited subframe cluster by receiving dedicated high-layer signaling for the UE or public high-layer signaling transmitted by the base station side, and the terminal side does not receive the ePDCCH in the PDSCH region on the subframes of the first detection-limited subframe cluster or receives the downlink or uplink control signaling of the UE1 in the PDCCH region. The UE1 receives the ePDCCH using an extended CP on the subframes of the second detection-limited subframe cluster.

Scene Nineteen:

Assuming that UE1 is a terminal of R11 or a terminal of a higher version, the base station side notifies the terminal side of the first detection-limited subframe cluster and the second detection-limited subframe cluster through dedicated high-layer signaling for the UE or public high-layer signaling. The base station side does not transmit the ePHICH in the PDSCH region on the subframes of the first detection-limited subframe cluster or transmits the PHICH-related signaling of the UE1 in the PHICH region or the non-PDSCH region. The base station side transmits the ePHICH in the PDSCH region using an extended CP on the subframes of the second detection-limited subframe cluster.

The UE1 obtains the first detection-limited subframe cluster and the second detection-limited subframe cluster by receiving dedicated high-layer signaling for the UE or public high-layer signaling transmitted by the base station side, and the terminal side does not receive the ePHICH in the PDSCH region on the subframes of the first detection-limited subframe cluster or receives the PHICH control signaling of the UE1 in the PHICH region or the non-PDSCH region. The UE1 receives the ePHICH in the PDSCH region using an extended CP on the subframes of the second detection-limited subframe cluster.

Scene Twenty:

Assuming that UE1 is a terminal of R11 or a terminal of a higher version, the base station side notifies the terminal side of the first detection-limited subframe cluster and the second detection-limited subframe cluster through dedicated high-layer signaling for the UE or public high-layer signaling. The base station side does not transmit the eCSS in the PDSCH region on the subframes of the first detection-limited subframe cluster or transmits the CSS-related signaling of the UE1 in the CSS region or the non-PDSCH region. The base station side transmits the eCSS control signaling in the PDSCH region using an extended CP on the subframes of the second detection-limited subframe cluster.

The UE1 obtains the first detection-limited subframe cluster and the second detection-limited subframe cluster by receiving dedicated high-layer signaling for the UE or public high-layer signaling transmitted by the base station side, and the terminal side does not receive the eCSS in the PDSCH region on the subframes of the first detection-limited subframe cluster or receives the CSS control signaling of the UE1 in the CSS region or the non-PDSCH region. The UE1 receives the eCSS control signaling in the PDSCH region using an extended CP on the subframes of the second detection-limited subframe cluster.

Scene Twenty-one:

Assuming that UE1 is a terminal of R11 or a terminal of a higher version, the base station side notifies the terminal side of the detection-limited subframe cluster through dedicated high-layer signaling for the terminal or public high-layer signaling in combination with PMCH subframe configuration signaling and/or configuration signaling of the PRS subframe only transmitted on the MBSFN subframes. The base station side does not transmit the ePDCCH in the PDSCH region on the subframes of the detection-limited subframe cluster or transmits the PDCCH control signaling of the UE1 in the PDCCH region or the non-PDSCH region. Wherein, the related public high-layer signaling can be control signaling of a system message block.

The UE1 obtains the detection-limited subframe cluster of the terminal side by receiving dedicated high-layer signaling for the terminal, or public high-layer signaling in combination with PMCH subframe configuration signaling and/or configuration signaling of the PRS subframe only transmitted on the MBSFN subframes, transmitted by the base station side, and the UE1 does not receive the ePHICH in the PDSCH region on the subframes of the detection-limited subframe cluster or receives the PHICH control signaling of the UE1 in the PHICH region or the non-PDSCH region.

Scene Twenty Two:

Assuming that UE1 is a terminal of R11 or a terminal of a higher version, the base station side notifies the terminal side of the detection-limited subframe cluster through dedicated high-layer signaling for the terminal or public high-layer signaling in combination with PMCH subframe configuration signaling and/or configuration signaling of the PRS subframe only transmitted on the MBSFN subframes. The base station side does not transmit the ePHICH in the PDSCH region on the subframes of the detection-limited subframe cluster or transmits the PHICH control signaling of the UE1 in the PHICH region or the non-PDSCH region. Wherein, the related public high-layer signaling can be control signaling of a system message block.

The UE1 obtains the detection-limited subframe cluster of the terminal side by receiving dedicated high-layer signaling for the terminal or public high-layer signaling in combination with PMCH subframe configuration signaling and/or configuration signaling of the PRS subframe only transmitted on the MBSFN subframes, transmitted by the base station side, and the UE1 does not receive the ePHICH in the PDSCH region on the subframes of the detection-limited subframe cluster or receives the PHICH control signaling of the UE1 in the PHICH region or the non-PDSCH region.

Scene Twenty-three:

Assuming that UE1 is a terminal of R11 or a terminal of a higher version, the base station side notifies the terminal side of the detection-limited subframe cluster through dedicated high-layer signaling for the terminal or public high-layer signaling in combination with PMCH subframe configuration signaling and/or configuration signaling of the PRS subframe only transmitted on the MBSFN subframes. The base station side does not transmit the eCSS control signaling in the PDSCH region on the subframes of the detection-limited subframe cluster or transmits the CSS control signaling of the UE1 in the CSS region or the non-PDSCH region. Wherein, the related public high-layer signaling can be control signaling of a system message block.

The UE1 obtains the detection-limited subframe cluster of the terminal side by receiving dedicated high-layer signaling for the terminal or public high-layer signaling in combination with PMCH subframe configuration signaling and/or configuration signaling of the PRS subframe only transmitted on the MBSFN subframes, transmitted by the base station side, and the UE1 does not receive the eCSS control signaling in the PDSCH region on the subframes of the detection-limited subframe cluster or receives the CSS control signaling of the UE1 in the CSS region or the non-PDSCH region.

Scene Twenty-four:

Assuming that UE1 is a terminal of R11 or a terminal of a higher version, the base station side notifies the terminal side of the first detection-limited subframe cluster through dedicated high-layer signaling for the terminal or public high-layer signaling in combination with PMCH transmission subframe configuration. The base station side does not transmit the ePDCCH in the PDSCH region on the subframes of the first detection-limited subframe cluster or transmits the downlink or uplink control signaling of the UE1 in the PDCCH region. The base station side notifies the terminal side of the second detection-limited subframe cluster through dedicated high-layer signaling for the terminal or public high-layer signaling in combination with the configuration of the PRS subframe only transmitted on the MBSFN subframes. The base station side transmits the ePDCCH using an extended CP on the subframes of the second detection-limited subframe cluster.

The UE1 obtains the first detection-limited subframe cluster by receiving dedicated high-layer signaling for the terminal or public high-layer signaling in combination with the PMCH transmission subframe configuration, transmitted by the base station side, and the terminal does not receive the ePDCCH in the PDSCH region on the subframes of the first detection-limited subframe cluster or receives the downlink or uplink control signaling of the UE1 in the PDCCH region. The UE1 obtains the second detection-limited subframe cluster by receiving dedicated high-layer signaling for the terminal or public high-layer signaling in combination with the configuration of the PRS subframe only transmitted on the MBSFN subframes, transmitted by the base station side, and the UE1 receives the ePDCCH using an extended CP on the subframes of the second detection-limited subframe cluster.

Scene Twenty-five:

Assuming that UE1 is a terminal of R11 or a terminal of a higher version, the base station side notifies the terminal side of the first detection-limited subframe cluster through dedicated high-layer signaling for the terminal or public high-layer signaling in combination with PMCH transmission subframe configuration. The base station side does not transmit the ePHICH in the PDSCH region on the subframes of the first detection-limited subframe cluster or transmits the PHICH-related signaling of the UE1 in the PHICH region or the non-PDSCH region. The base station side notifies the terminal side of the second detection-limited subframe cluster through dedicated high-layer signaling for the terminal or public high-layer signaling in combination with the configuration of the PRS subframe only transmitted on the MBSFN subframes. The base station side transmits the ePHICH in the PDSCH region using an extended CP on the subframes of the second detection-limited subframe cluster.

The UE1 obtains the first detection-limited subframe cluster by receiving dedicated high-layer signaling for the terminal or public high-layer signaling in combination with the PMCH transmission subframe configuration, transmitted by the base station side, and the terminal does not receive the ePHICH in the PDSCH region on the subframes of the first detection-limited subframe cluster or receives the PHICH control signaling of the UE1 in the PHICH region or the non-PDSCH region. The UE1 obtains the second detection-limited subframe cluster of the terminal side by receiving dedicated high-layer signaling for the terminal or public high-layer signaling in combination with the configuration of the PRS subframe only transmitted on the MBSFN subframes, transmitted by the base station side, and the UE1 receives the ePHICH in the PDSCH region using an extended CP on the subframes of the second detection-limited subframe cluster.

Scene Twenty-six:

Assuming that UE1 is a terminal of R11 or a terminal of a higher version, the base station side notifies the terminal side of the first detection-limited subframe cluster through dedicated high-layer signaling for the terminal or public high-layer signaling in combination with PMCH transmission subframe configuration. The base station side does not transmit the eCSS in the PDSCH region on the subframes inside the first detection-limited subframe cluster or transmits the CSS-related signaling of the UE1 in the CSS region or the non-PDSCH region. The base station side notifies the terminal side of the second detection-limited subframe cluster through dedicated high-layer signaling for the terminal or public high-layer signaling in combination with the configuration of the PRS subframe only transmitted on the MBSFN subframes. The base station side transmits the eCSS control signaling in the PDSCH region using an extended CP on the subframes of the second detection-limited subframe cluster.

The UE1 obtains the first detection-limited subframe cluster by receiving dedicated high-layer signaling for the terminal or public high-layer signaling in combination with the PMCH transmission subframe configuration, transmitted by the base station side, and the terminal does not receive the eCSS in the PDSCH region on the subframes of the first detection-limited subframe cluster or receives the CSS control signaling of the UE1 in the CSS region or the non-PDSCH region. The UE1 obtains the second detection-limited subframe cluster by receiving dedicated high-layer signaling for the terminal or public high-layer signaling in combination with the configuration of the PRS subframe only transmitted on the MBSFN subframes, transmitted by the base station side, and the UE1 receives the eCSS control signaling in the PDSCH region using an extended CP on the subframes of the second detection-limited subframe cluster.

Scene Twenty-seven:

Assuming that UE1 is a terminal of R11 or a terminal of a higher version, the base station side notifies the terminal side of the detection-limited subframe cluster information through PMCH transmission subframe configuration and/or configuration of the PRS subframe only transmitted on the MBSFN subframes. The base station side transmits the ePDCCH or the ePHICH or eCSS-related signaling according to an extended CP on the subframes of the detection-limited subframe cluster.

The UE1 obtains the PMCH transmission subframe configuration and/or the configuration of the PRS subframe only transmitted on the MBSFN subframes by receiving the signaling transmitted by the base station side, thus obtaining the detection-limited subframe cluster information. The UE1 receives the ePDCCH or the ePHICH or eCSS-related signaling according to an extended CP on the subframes inside the detection-limited subframe cluster.

Scene Twenty-eight:

Assuming that UE1 is a terminal of R11 or a terminal of a higher version, the base station side notifies the terminal side of the detection-limited subframe cluster information through PMCH transmission subframe configuration and/or configuration of the PRS subframe only transmitted on the MBSFN subframes. The base station side transmits the ePDCCH or the ePHICH or eCSS-related signaling according to an extended CP or a normal CP on the subframes inside the detection-limited subframe cluster.

The UE1 obtains the PMCH transmission subframe configuration and/or configuration of the PRS subframe only transmitted on the MBSFN subframes by receiving the signaling transmitted by the base station side, thus obtaining the detection-limited subframe cluster information. The UE1 receives the ePDCCH or the ePHICH or eCSS-related signaling according to an extended CP or a normal CP as candidate detection sets on the subframes inside the detection-limited subframe cluster.

Scene Twenty-nine:

Assuming that UE1 is a terminal of R11 or a terminal of a higher version, when the UE1 detects that the subframe 0 is of a normal CP length, the UE1 configures the PDCCH region and the PDSCH region as candidate detection regions on all MBSFN subframes, to detect and receive the ePDCCH or PDCCH or ePHICH or PHICH or eCSS or CSS-related signaling.

Scene Thirty:

Assuming that UE1 is a terminal of R11 or a terminal of a higher version, when the UE1 detects that the subframe 0 is of a normal CP length, the UE1 detect the PDCCH or PHICH or CSS-related signaling on the PDCCH region of all PRS subframes only transmitted on the MBSFN subframes.

Scene Thirty-one:

Assuming that UE1 is a terminal of R11 or a terminal of a higher version, when the UE1 detects that the subframe 0 is of a normal CP length, the UE1 receives the ePDCCH or PDCCH or ePHICH or PHICH or eCSS or CSS-related signaling on all PRS subframes only transmitted on the MBSFN subframes.

Alternatively, assuming that UE1 is a terminal of R11 or a terminal of a higher version, when the UE detects that the subframe 0 is of a normal CP length, the UE1 does not detect the ePDCCH and/or ePHICH and/or eCSS channel on all PRS subframes only transmitted on the MBSFN subframes.

EXAMPLE ONE the base station configures the limited subframe cluster for the terminal through the dedicated high-layer signaling for the terminal, and the terminal detects the PDCCH and/or PHICH and/or eCSS inside the limited subframe cluster and detects the ePDCCH and/or ePHICH and/or eCSS channel outside the limited subframe cluster.

When the terminal detects that the subframe 0 is of a normal CP length, and there are PRS subframes only transmitted on the MBSFN subframes in the subframes outside the limited subframe cluster, the terminal does not receive and detect the ePDCCH and/or ePHICH and/or eCSS channel on the subframes.

EXAMPLE TWO the base station configures the limited subframe cluster for the terminal through the dedicated high-layer signaling for the terminal, and the terminal detects the PDCCH and/or PHICH and/or CSS inside the limited subframe cluster and detects the ePDCCH and/or ePHICH and/or eCSS channel outside the limited subframe cluster.

When the terminal detects that the subframe 0 is of a normal CP length, and there are PRS subframes only transmitted on the MBSFN subframes in the subframes outside the limited subframe cluster, the terminal does not receive and detect the ePDCCH and/or ePHICH and/or eCSS channel on the subframes, and the terminal detects the PDCCH and/or PHICH and/or CSS in the PDCCH region on the subframes.

Scene Thirty-two:

Assuming that UE1 is a terminal of R11 or a terminal of a higher version, the base station side notifies the terminal side of the detection-limited subframe cluster information through dedicated high-layer signaling for the terminal and public high-layer signaling. The UE1 obtains the detection-limited subframe cluster information of the terminal side by receiving the public high-layer signaling transmitted by the base station side, and when the UE1 detects the related control channel in the subframes inside the detection-limited subframe cluster, the related control channel is detected according to the size and range of the dedicated cluster level for the subframes inside the detection-limited subframe cluster. Wherein, the related control channel involved in the present scene at least includes one or more of ePDCCH, EPHICH and eCSS, while the related public high-layer signaling can be control signaling of a system message block.

For example, the cluster level for blindly detecting the ePDCCH on the subframes inside the detection-non-limited subframe cluster can be 1, 2, 4 and 8, while the cluster level for blindly detecting the ePDCCH on the subframes inside the detection-limited subframe cluster can be 2, 4, 8 and 16.

Scene Thirty-three:

Assuming that UE1 is a terminal of R11 or a terminal of a higher version, the base station side notifies the terminal side of the detection-limited subframe cluster information through dedicated high-layer signaling for the terminal and public high-layer signaling. The UE1 obtains the detection-limited subframe cluster information of the terminal side by receiving the public high-layer signaling transmitted by the base station side, and when the UE1 detects the related control channel in the subframes inside the detection-limited subframe cluster, the related control channel is detected according to an initial location or size or blind interval or range of the dedicated detection CCE or detection resource unit for the subframes inside the detection-limited subframe cluster. Wherein, the related control channel involved in the present scene at least includes one or more of ePDCCH, EPHICH and eCSS.

For example, the CCE size for blindly detecting the ePDCCH on the subframes inside the detection-not-limited subframe cluster can be the number of resource elements in ¼ resource block, while the CCE size for blindly detecting the ePDCCH on the subframes inside the detection-limited subframe cluster can be the number of resource elements in ½ resource block.

For another example, the CCE initial location for blindly detecting the ePDCCH on the subframes inside the detection-non-limited subframe cluster is calculated as starting the blind detection from the $X^{th}$ CCE according to the C-RNTI of the terminal and the CCE initial location parameters of the subframes inside the particular detection-non-limited subframe cluster, and the CCE initial location for blindly detecting the ePDCCH on the subframes inside the limited subframe cluster is calculated as starting the blind detection from the $Y^{th}$ CCE according to the C-RNTI of the terminal and the CCE initial location parameters of the subframes inside the particular detection-non-limited subframe cluster.

For another example, the CCE initial location for blindly detecting the ePDCCH on the subframes inside the detection-non-limited subframe cluster is calculated as starting the blind detection from the Xth CCE based on the configured blind detection interval of Nx (Nx>0) according to the C-RNTI of the terminal and the CCE initial location parameters of the subframes inside the particular detection-non-limited subframe cluster, and the CCE initial location for blindly detecting the ePDCCH on the subframes inside the limited subframe cluster is calculated as starting the blind detection from the $Y^{th}$ CCE based on the configured blind detection interval of Ny (Ny>0) according to the C-RNTI of the terminal and the CCE initial location parameters of the subframes inside the particular detection-non-limited subframe cluster.

Scene Thirty-four:

Assuming that UE1 is a terminal of R11 or a terminal of a higher version, the base station side notifies the terminal side of the detection-limited subframe cluster information through dedicated high-layer signaling for the terminal and public high-layer signaling. The UE1 obtains the detection-limited subframe cluster information of the terminal side by receiving the public high-layer signaling transmitted by the base station side, and when the UE1 detects the related control channel in the subframes inside the detection-limited subframe cluster, the related control channel is detected according to the type and range of the dedicated detection DCI format for the subframes inside the detection-limited subframe cluster. Wherein, the related control channel involved in the present scene at least includes one or more of ePDCCH, EPHICH and eCSS.

For example, when the UE1 is configured as TM9, the DCI format for blindly detecting the ePDCCH on the subframes inside the detection-non-limited subframe cluster is DCI format 1A or DCI format 2C, while the DCI format for blindly detecting the ePDCCH on the subframes inside the limited subframe cluster is DCI format 1A.

Scene Thirty-five:

Assuming that UE1 is a terminal of R11 or a terminal of a higher version, the base station side notifies the terminal side of the detection-limited subframe cluster information through dedicated high-layer signaling for the terminal and public high-layer signaling. The UE1 obtains the detection-limited subframe cluster information of the terminal side by receiving the public high-layer signaling transmitted by the base station side, and when the UE1 detects the related control channel in the subframes inside the detection-limited subframe cluster, the related control channel is detected according to the number of candidate detection sets dedicated for the subframes inside the detection-limited subframe cluster. Wherein, the related control channel involved in the present scene at least includes one or more of ePDCCH, EPHICH and eCSS.

For example, the detection candidate sets inside the detection-non-limited subframe cluster are {L(1):0,1,2,3,4,5}, {L(2):0,2,4,6}, {L(4):0,4}, {L(8):0,8}, while the detection candidate sets inside the detection-limited subframe cluster are {L(1):0,1,2,3}, {L(2):4,6}, {L(4):0,4}, {L(8):0,8}.

Scene Thirty-six:

Assuming that UE1 is a terminal of R11 or a terminal of a higher version, the base station side notifies the terminal side of the detection-limited subframe cluster information through dedicated high-layer signaling for the terminal and public high-layer signaling. The UE1 obtains the detection-limited subframe cluster information of the terminal side by receiving the public high-layer signaling transmitted by the base station side, and when the UE1 detects the related control channel in the subframes inside the detection-limited subframe cluster, the related control channel is detected according to a detection carrier configured for the subframes inside the detection-limited subframe cluster. The related control channel involved in the present scene at least includes one or more of ePDCCH, EPHICH and eCSS.

For example, on the subframes inside the detection-non-limited subframe cluster, the UE1 receives the related control channel on carrier 1, and on the subframes inside the detection-limited subframe cluster, the UE11 receives the related control channel on carrier 2.

For another example, on the subframes inside the detection-non-limited subframe cluster, the UE1 receives the related control channel in the PDSCH region of carrier 1, and on the subframes inside the detection-limited subframe cluster, the UE1 receives the related control channel (for example, the PDCCH, PHICH or CSS control channel) in non-PDSCH region of carrier 2.

Embodiment Three

The present embodiment introduces a base station, which can implement the method of the above embodiment one. Specifically, the base station includes the following modules:

a first module, set to configure the detection-limited subframe cluster information of a control channel for a terminal side, so as to notify the terminal side of a manner by which the base station side transmits the control channel; and a second module, set to transmit the control channel;

wherein, the manner by which the second module transmits the control channel is that the control channel is only transmitted on subframes outside the detection-limited subframe cluster; or the manner by which the second module transmits the control channel is at least one or a combination of a plurality of the following manners:

the control channel is transmitted respectively in a control channel region independently configured for the subframes inside the detection-limited subframe cluster and in a control channel region independently configured for the subframes outside the detection-limited subframe cluster;

the control channel is transmitted on the subframes inside the detection-limited subframe cluster according to a subframe Cyclic Prefix (CP) length configured in the detection-limited subframe cluster;

the control channel is transmitted respectively in the range of a detection aggregation level independently configured for subframes inside the detection-limited subframe cluster and in the range of a detection aggregation level independently configured for subframes outside the detection-limited subframe cluster;

the control channel is transmitted respectively on various parameters of detection control channel elements or detection resource units or an enhanced resource element group or a resource element group independently configured for subframes inside the detection-limited subframe cluster and on various parameters of detection control channel elements or detection resource units or an enhanced resource element group or a resource element group independently configured for subframes outside the detection-limited subframe cluster, wherein, the parameters of detection control channel elements or detection resource units or an enhanced resource element group or a resource element group at least include one or more of the following: a size, a detection interval, a detection initial location, and a detection range;

the control channel is transmitted according to a detection Downlink Control Information (DCI) format type independently configured for subframes inside the detection-limited subframe cluster and according to a detection DCI format type independently configured for subframes outside the detection-limited subframe cluster;

the control channel is transmitted according to the number of candidate detection sets configured independently for subframes inside the detection-limited subframe cluster and according to the number of candidate detection sets configured independently for subframes outside the detection-limited subframe cluster;

the control channel is transmitted on a detection carrier independently configured for subframes inside the detection-limited subframe cluster and on a detection carrier independently configured for subframes outside the detection-limited subframe cluster;

the control channel at least includes one or more of the following:

an Enhanced Physical Downlink Control Channel (ePDCCH), an Enhanced Physical Hybrid ARQ Indicator Channel (ePHICH) and an Enhanced Channel Signaling System (eCSS).

Wherein, the control channel regions, the subframe CP length, the range of the detection cluster level, the various parameters of detection control channel elements or detection resource units or an enhanced resource element group or a resource element group, the detection DCI format type, the number of candidate detection sets and the detection carrier independently configured for the subframes inside the detection-limited subframe cluster and the subframes outside the detection-limited subframe cluster are agreed on by the base station side and the terminal side in advance, or are configured for the terminal side by the base station side through dedicated or public high-layer signaling.

In the present embodiment, the first module is set to configure the detection-limited subframe cluster information of the control channel for the terminal side at least through one or more of the following manners:

configuring through Physical Multicast Channel (PMCH) transmission subframe configuration, through configuration of a Positioning reference signal (PRS) subframe only transmitted on the Multicast Broadcast Single Frequency Network (MBSFN) subframe, through configuration of a PRS subframe only transmitted on the MBSFN subframes when the subframe 0 is of a normal CP length, through MBSFN subframe configuration, through special subframe configuration of a Time Division Duplex (TDD) system, through Channel Statement Information Reference Signal (CSI-RS) subframe configuration, and through dedicated high-layer signaling configuration.

It should be illustrated that, when configuring the detection-limited subframe cluster information of the control channel through the dedicated higher-layer signaling, the first module notifies the terminal side of the detection-limited subframe cluster information of the control channel using a bitmap sequence, wherein, each bit in the bitmap represents one subframe or resource block; or notifies the terminal side of the detection-limited subframe cluster information of the control channel in a notification way of using a bitmap sequence and periodic configuration in combination with subframe offset configuration. The bitmap sequence herein is of 6 bits or 10 bits or 40 bits or 24 bits.

In addition, the first module can also notify the terminal side of the detection-limited subframe cluster information of the control channel through a subframe offset index and periodic configuration in combination with encoding when configuring for a terminal side the detection-limited subframe cluster information of a control channel.

When configuring for a terminal side the detection-limited subframe cluster information of a control channel, the first module can independently configure for the terminal side the detection-limited subframe cluster information of ePDCCH and ePHICH respectively; or independently configure the detection-limited subframe cluster information of ePDCCH and eCSS respectively, and uniformly configure the detection-limited subframe cluster information of the ePDCCH and ePHICH for the terminal side; or uniformly configure for the terminal side the detection-limited subframe cluster information of the ePDCCH, PHICH and eCSS.

In some preferable solutions, the above base station side can further comprise a third module, set to configure one or more of the following information for all terminal sides (all terminals here include terminals with the abilities of receiving the following information in the prior art and terminals without the abilities of receiving the following information in the prior art):

PMCH transmission subframe configuration, configuration of the PRS subframe only transmitted on the MBSFN subframe. CP length configuration of the subframe 0, configuration of the PRS subframe only transmitted on the MBSFN subframes when the subframe 0 is of a normal CP length, MBSFN subframe configuration, special subframe configuration of a TDD system, CSI-RS subframe configuration.

Embodiment Four

The present embodiment introduces a terminal, which can implement the above method of embodiment two. Specifically, the terminal includes the following modules:

a first module, set to receive the detection-limited subframe cluster information of a control channel configured by a network side, and determine a manner by which the control channel is detected according to the detection-limited subframe cluster information; and a second module, set to detect the control channel according to the manner determined by the first module;

wherein, the manner by which the control channel is detected by the second module is that the control channel is only detected on subframes outside the detection-limited subframe cluster; or the control channel is detected according to at least one or a combination of a plurality of the following manners:

the control channel is detected respectively according to a control channel region independently configured for the subframes inside the detection-limited subframe cluster on the subframes inside the detection-limited subframe cluster and according to a control channel region independently configured for the subframes outside the limited subframe cluster on the subframes outside the limited subframe cluster;

the control channel is detected on the subframes inside the detection-limited subframe cluster according to a subframe Cyclic Prefix (CP) length configured in the detection-limited subframe cluster;

the control channel is detected respectively according to the range of a detection aggregation level independently configured for subframes inside the detection-limited subframe cluster on the subframes inside the detection-limited subframe cluster and according to the range of a detection aggregation level independently configured for subframes outside the detection-limited subframe cluster on the subframes outside the detection-limited subframe cluster;

the control channel is detected respectively according to various parameters of detection control channel elements or detection resource units or an enhanced resource element group or a resource element group independently configured for subframes inside the detection-limited subframe cluster on the subframes inside the detection-limited subframe cluster and according to various parameters of detection control channel elements or detection resource units or an enhanced resource element group or a resource element group independently configured for subframes outside the detection-limited subframe cluster on the subframes outside the detection-limited subframe cluster, wherein, the parameters of detection control channel elements or detection resource units or an enhanced resource element group or a resource element group include one or more of the following: a size, a detection interval, a detection initial location, and a detection range;

the control channel is detected according to a detection Downlink Control Information (DCI) format type independently configured for subframes inside the detection-limited subframe cluster on the subframes inside the detection-limited subframe cluster and according to a detection DCI format type independently configured for subframes outside the detection-limited subframe cluster on the subframes outside the detection-limited subframe cluster; and the control channel is detected according to the number of candidate detection sets configured independently for subframes inside the detection-limited subframe cluster on the subframes inside the detection-limited subframe cluster and according to the number of candidate detection sets configured independently for subframes outside the detection-limited subframe cluster on the subframes outside the detection-limited subframe cluster;

the control channel is detected on a detection carrier independently configured for subframes inside the detection-limited subframe cluster and on a detection carrier independently configured for subframes outside the detection-limited subframe cluster;

the control channel at least includes one or more of the following:

an Enhanced Physical Downlink Control Channel (ePDCCH), an Enhanced Physical Hybrid ARQ Indicator Channel (ePHICH) and an Enhanced Channel Signaling System (eCSS).

Wherein, the control channel regions, the subframe CP length, the range of the detection cluster level, the various parameters of detection control channel elements or detection resource units or an enhanced resource element group or a resource element group, the detection DCI format type, the number of candidate detection sets and the detection carrier independently configured for the subframes inside the detection-limited subframe cluster and the subframes outside the detection-limited subframe cluster are agreed on by the terminal side and the base station side in advance, or are received by the terminal side through dedicated high-layer signaling, or are received by the terminal side through public high-layer signaling. The public high-layer signaling includes: a master information block and a system information block.

In the present embodiment, the first module receives the detection-limited subframe cluster information of the control channel configured by the base station side at least through one or more of the following manners:

receiving through Physical Multicast Channel (PMCH) transmission subframe configuration information, through configuration information of a Positioning reference signal (PRS) subframe only transmitted on the Multicast Broadcast Single Frequency Network (MBSFN) subframe, through CP length configuration information of a subframe 0, through configuration information of the PRS subframe only transmitted on the MBSFN subframes when the subframe 0 is of a normal CP length, through the MBSFN subframe configuration information, through special subframe configuration information of a Time Division Duplex (TDD) system, through the Channel Statement Information Reference Signal (CSI-RS) subframe configuration information, and through the dedicated high-layer signaling configuration information.

It should be pointed out that the first module receives the detection-limited subframe cluster information of the control channel by a bitmap sequence when receiving the detection-limited subframe cluster information of the control channel configured by the base station side through the dedicated higher-layer signaling, wherein, each bit in the bitmap represents one subframe or resource block.

The first module also receives the detection-limited subframe cluster information of the control channel by a way of using a bitmap sequence and periodic configuration in combination with subframe offset configuration when receiving the detection-limited subframe cluster information of the control channel configured by the base station side through the dedicated higher-layer signaling.

The bitmap sequence involved in the present embodiment is of 6 bits or 10 bits or 40 bits or 24 bits.

Besides the above manners, the first module can further receive the detection-limited subframe cluster information of the control channel through a subframe offset index and periodic configuration in combination with encoding when receiving the detection-limited subframe cluster information of the control channel configured by the base station side.

There can be a variety of manners for the first module above receiving the detection-limited subframe cluster information of the control channel configured by the base station side. For example, the first module can independently receive the detection-limited subframe cluster information of ePDCCH and ePHICH respectively. Alternatively, the first module independently receives the detection-limited subframe cluster information of ePDCCH and eCSS respectively and uniformly receives the detection-limited subframe cluster information of the ePDCCH and ePHICH. Alternatively, the first module uniformly receives the detection-limited subframe cluster information of the ePDCCH, PHICH and eCSS.

In some preferable solutions, for the scene that a CP configuration length of subframe 0 is a normal CP length, it is stipulated that the second module detects the control channel on all MBSFN subframes according to an extended CP length; or blindly detects the ePDCCH on the subframes inside the detection-limited subframe cluster according to an extended CP length; or detects the control channel in the PDCCH region and PDSCH region of all MBSFN subframes; or uses a normal CP length and an extended CP length as candidate lengths for detecting the control channel in the PDSCH region of all MBSFN subframes, and if a target control channel is detected according to one length therein, does not detect with respect to another length again; or detects the control channel in the PDCCH region of all MBSFN subframes; or detects the control channel in the PDCCH region of the subframes inside the detection-limited subframe cluster, or only detects the control channel on the subframes outside the detection-limited subframe cluster; or does not detect the control channel in the subframes inside the detection-limited subframe cluster.

Of course, the present embodiment is not limited to the implementation manner of the above scene, and the second module can detect the control channel on all MBSFN subframes according to an extended CP length; or blindly detect the ePDCCH on subframes outside the detection-limited subframe cluster according to an extended CP length; detect the control channel in the PDCCH region and PDSCH region of all MBSFN subframes; or detect the control channel in the PDCCH region of all MBSFN subframes; or use a normal CP length and an extended CP length as candidate lengths for detecting the control channel in the PDSCH region of all MBSFN subframes, and if a target control channel is detected according to one length therein, do not detect with respect to another length again; or detect the control channel in the PDCCH region of the subframes inside the detection-limited subframe cluster.

Based on the above terminal, there is another implementation manner, wherein the terminal further comprises a third module, configured to receive one or more of the following information:

PMCH transmission subframe configuration, configuration of the PRS subframe only transmitted on the MBSFN subframe, CP length configuration of the subframe 0, configuration of the PRS subframe only transmitted on the MBSFN subframes when the subframe 0 is of a normal CP length, MBSFN subframe configuration, special subframe configuration of a TDD system, CSI-RS subframe configuration.

It should be particularly noted that, a terminal comprising a third module for receiving information is not limited to the terminal with the ability of receiving the above configuration information in the prior art, and also comprises terminals without the ability of receiving the above configuration information in the prior art.

A person having ordinary skill in the art can understand that all or a part of steps in the above method can be implemented by programs instructing related hardware, and the programs can be stored in a computer readable storage medium, such as a read-only memory, disk or CD-ROM etc. Alternatively, all or part of steps in the above embodiments can also be implemented by one or more integrated circuits. Accordingly, each module/unit in the above embodiments can be implemented in a form of hardware, and can also be implemented in a form of software functional module. The present application is not limited to a combination of any particular forms of hardware and software.

The above description is only the preferred embodiments of the present document and is not intended to limit the protection scope of the present document. Any modification, equivalent substitution, improvement etc. which are made inside the spirit and principle of the present document should belong to the protection scope of the present document.

Industrial Applicability

Compared with the prior art, the technical solution of the present application avoids problems such as false detection etc. when the ePDCCH, ePHICH, eCSS and PMCH subframes or PRS subframes only configured to be transmitted on MBSFN subframes collide or resulting in that the subframes configured with excessive CSI-RS resources make available resource elements less, such that both the base station side and the terminal side can properly transmit and receive related control channels, thus avoiding the complexity of blind detection by the terminal side.

What is claimed is:

1. A method for transmitting a control channel, comprising:
  a base station side configuring detection-limited subframe cluster information of a control channel for a terminal side, so as to notify the terminal side of a manner by which the base station side transmits the control channel;
  wherein, the manner by which the base station side transmits he control channel is that the control channel is only transmitted on subframes outside the detection-limited subframe cluster; or the mmanner by which the base station side transmits the control channel is at least one or a combination of a plurality of the following manners:

the control channel is transmitted respectively in a control channel region independently configured for subframes inside the detection-limited subframe cluster and in a control channel region independently configured for the subframes outside the detection-limited subframe cluster;

the control channel is transmitted on the subframes inside the detection-limited subframe cluster according to a subframe Cyclic Prefix (CP) length configured in the detection-limited subframe cluster;

the control channel is transmitted respectively in a range of a detection aggregation level independently configured for the subframes inside the detection-limited subframe cluster and in a range of a detection aggregation level independently configured for the subframes outside the detection-limited subframe cluster;

the control channel is transmitted respectively on various parameters of detection control channel elements or detection resource units or enhanced resource element groups or resource element groups independently configured for the subframes inside the detection-limited subframe cluster and on various parameters of detection control channel elements or detection resource units or enhanced resource element groups or resource element groups independently configured for the subframes outside the detection-limited subframe cluster, wherein, the various parameters of detection control channel elements or detection resource units or enhanced resource element groups or resource element groups at least comprise one or more of the following: a size, a detection interval, a detection initial location, and a detection range;

the control channel is transmitted according to a detection Downlink Control Information (DCI) format type independently configured for the subframes inside the detection-limited subframe cluster and according to a detection DCI format type independently configured for the subframes outside the detection-limited subframe cluster;

the control channel is transmitted according to a number of candidate detection sets configured independently for the subframes inside the detection-limited subframe cluster and according to a number of candidate detection sets configured independently by the subframes outside the detection-limited subframe cluster;

the control channel is transmitted on a detection carrier independently configured for the subframes inside the detection-limited subframe cluster and on a detection carrier independently configured for the subframes outside the detection-limited subframe cluster;

the control channel at least comprises one or more of the following:

an Enhanced Physical Downlink Control Channel (ePDCCH), an Enhanced Physical Hybrid ARQ Indicator Channel (ePHICH) and an Enhanced Channel Signaling System (eCSS).

2. The method according to claim 1, wherein, the control channel regions, the subframe CP length, the range of the detection cluster level, the various parameters of detection control channel elements or detection resource units or enhanced resource element groups or resource element groups, the detection DCI format type, the number of candidate detection sets and the detection carrier independently configured for the subframes inside the detection-limited subframe cluster and the subframes outside the detection-limited subframe cluster are agreed on by the base station side and the terminal side in advance, or are configured for the terminal side by the base station side through dedicated or public high-layer signaling, preferably, wherein, the public high-layer signaling comprises: a master information block and a system information block.

3. The method according to claim 1, wherein, the base station side at least configures the detection-limited subframe cluster information of the control channel for the terminal side through one or more of the following manners:

configuring through Physical Multicast Channel (PMCH) transmission subframe configuration, through configuration of a Positioning Reference Signal (PRS) subframe only transmitted on Multicast Broadcast Single Frequency Network (MBSFN) subframes, through configuration of a PRS subframe only transmitted on the MBSFN subframes when a subframe 0 is of a normal CP length, through MBSFN subframe configuration, through special subframe configuration of a Time Division Duplex (TDD) system, through Channel Statement Information Reference Signal (CSI-RS) subframe configuration, and through dedicated high-layer signaling configuration.

4. The method according to claim 3, wherein, the base station side notifies the terminal side of the detection-limited subframe cluster information of the control channel using a bitmap sequence when configuring the detection-limited subframe cluster information of the control channel through the dedicated higher-layer signaling, wherein, each bit in the bitmap sequence represents one subframe or resource block, preferably, wherein, the bitmap sequence is of 6 bits or 10 bits or 40 bits or 24 bits, or, wherein, the base station side notifies the terminal side of the detection-limited subframe cluster information of the control channel in a notification way of using a bitmap sequence and periodic configuration in conjunction with subframe offset configuration when configuring the detection-limited subframe cluster information of the control channel through the dedicated higher-layer signaling, preferably, wherein, the bitmap sequence is of 6 bits or 10 bits or 40 bits or 24 bits, or, wherein, the step of a base station side configuring detection-limited subframe cluster information of a control channel for a terminal side comprises: the base station side notifying the terminal side of the detection-limited subframe cluster information of the control channel through a subframe offset index and periodic configuration in combination with encoding.

5. The method according to claim 1, wherein, the step of a base station side configuring detection-limited subframe cluster information of a control channel for a terminal side comprises:

the base station side independently configuring, for the terminal side, the detection-limited subframe cluster information of the ePDCCH and ePHICH respectively, or, wherein, the step of a base station side configuring detection-limited subframe cluster information of a control channel for a terminal side comprises: the base station side independently configuring the detection-limited subframe cluster information of the ePDCCH and eCSS respectively, and uniformly configuring the detection-limited subframe cluster information of the ePDCCH and ePHICH for the terminal side, or, wherein, the step of a base station side configuring detection-limited subframe cluster information of a control channel for a terminal side comprises: the base station side uniformly configuring, for the terminal side, the detection-limited subframe cluster information of the ePDCCH, PHICH and eCSS.

6. The method according to claim 1, further comprising: the base station side configuring, for the terminal side, one or more of the following information:

PMCH transmission subframe configuration, configuration of the PRS subframe only transmitted on the MBSFN subframe, CP length configuration of the subframe 0, configuration of the PRS subframe only transmitted on the MBSFN subframes when the subframe 0 is of a normal CP length, MBSFN subframe configuration, special subframe configuration of a TDD system, CSI-RS subframe configuration.

7. A method for receiving a control channel, comprising:

a terminal side receiving detection-limited subframe cluster information of a control channel configured by a base station side, determining a manner by which the control channel is detected according to the detection-limited subframe cluster information, and detecting the control channel according to the determined manner;

wherein, the manner by which the control channel is detected by the terminal side is that the control channel is only detected on subframes outside the detection-limited subframe cluster; or the control channel is detected according to at least one or a combination of a plurality of the following manners:

the control channel is detected respectively according to a control channel region independently configured for subframes inside the detection-limited subframe cluster on subframes inside the detection-limited subframe cluster and according to a control channel region independently configured for the subframes outside the limited subframe cluster on the subframes outside the limited subframe cluster;

the control channel is detected on the subframes inside the detection-limited subframe cluster according to a subframe Cyclic Prefix (CP) length configured the detection-limited subframe cluster;

the control channel is detected respectively according to a range of a detection aggregation level independently configured for subframes inside the detection-limited subframe cluster on the subframes inside the detection-limited subframe cluster and according to a range of a detection aggregation level independently configured for subframes outside the detection-limited subframe cluster on the subframes outside the detection-limited subframe cluster;

the control channel is detected respectively according to various parameters of detection control channel elements or detection resource units or enhanced resource element groups or resource element groups independently configured for subframes inside the detection-limited subframe cluster on the subframes inside the detection-limited subframe cluster and according to various parameters of detection control channel elements or detection resource units or enhanced resource element groups or resource element groups independently configured for subframes outside the detection-limited subframe cluster on the subframes outside the detection-limited subframe cluster, wherein, the various parameters of detection control channel elements or detection resource units or enhanced resource element groups or resource element groups comprise one or more of the following: a size, a detection interval, a detection initial location, and a detection range;

the control channel is detected according to a detection Downlink Control Information (DCI) format type independently configured for subframes inside the detection-limited subframe cluster on the subframes inside the detection-limited subframe cluster and according to a detection DCI format type independently configured for subframes outside the detection-limited subframe cluster on the subframes outside the detection-limited subframe cluster;

the control channel is detected according to a number of candidate detection sets configured independently for subframes inside the detection-limited subframe cluster on the subframes inside the detection-limited subframe cluster and according to a number of candidate detection sets configured independently for subframes outside the detection-limited subframe cluster on the subframes outside the detection-limited subframe cluster;

the control channel is detected on a detection carrier independently configured for subframes inside the detection-limited subframe cluster and on a detection carrier independently configured for subframes outside the detection-limited subframe cluster;

the control channel at least comprises one or more of the following:

an Enhanced Physical Downlink Control Channel (ePDCCH), an Enhanced Physical Hybrid ARQ Indicator Channel (ePHICH) and an Enhanced Channel Signaling System (eCSS).

8. The method according to claim 7, wherein, the control channel regions, the subframe CP length, the range of the detection cluster level, the various parameters of detection control channel elements or detection resource units or enhanced resource element groups or resource element groups, the detection DCI format type, the number of candidate detection sets and the detection carrier independently configured for the subframes inside the detection-limited subframe cluster and the subframes outside the detection-limited subframe cluster are agreed on by the terminal side and the base station side in advance, or are received by the terminal side through dedicated high-layer signaling, or are received by the terminal side through public high-layer signaling, preferably, wherein, the public high-layer signaling comprises: a master information block and a system information block.

9. The method according to claim 7, wherein, the terminal side at least receives the detection-limited subframe cluster information of the control channel configured by the base station side through one or more of the following manners:

receiving through Physical Multicast Channel (PMCH) transmission subframe configuration information, through configuration information of a Positioning Reference Signal (PRS) subframe only transmitted on Multicast Broadcast Single Frequency Network (MBSFN) subframes, through CP length configuration information of a subframe 0, through configuration information of a PRS subframe only transmitted on the MBSFN subframes when the subframe 0 is of a normal CP length, through the MBSFN subframe configuration information, through special subframe configuration information of a Time Division Duplex (TDD) system, through Channel Statement Information Reference Signal (CSI-RS) subframe configuration information, and through dedicated high-layer signaling configuration information.

10. The method according to claim 9, wherein, the terminal side receives the detection-limited subframe cluster information of the control channel by a bitmap sequence when receiving the detection-limited subframe cluster information of the control channel configured by the base station side through the dedicated higher-layer signaling, wherein, each bit in the bitmap sequence represents one subframe or resource block, preferably, wherein, the bitmap sequence is of 6 bits or 10 bits or 40 bits or 24 bits, or, wherein, the terminal side receives the detection-limited subframe cluster information of the control channel by a way of using a bitmap sequence and periodic configuration in conjunction with subframe offset configuration when receiving e detection-limited subframe cluster information of the control channel configured by the base station side through the dedicated higher-layer signaling, wherein, the bitmap sequence is of 6 bits or 10 bits or 40 bits or 24 bits, or, wherein, the step of a terminal side receiving the detection-limited subframe cluster information of a control channel configured by the base station side comprises: the terminal side receiving the detection-limited subframe cluster information of the control channel through a subframe offset index and periodic configuration in combination with encoding.

11. The method according to claim 7, wherein, the step of a terminal side receiving the detection-limited subframe cluster information of a control channel configured by the base station side comprises:

the terminal side independently receiving the detection-limited subframe cluster information of ePDCCH and ePHICH respectively, or, wherein, the step of a terminal side receiving the detection-limited subframe cluster information of a control channel configured by the base station side comprises: the terminal side independently receiving the detection-limited subframe cluster information of ePDCCH and eCSS respectively, and uniformly receiving the detection-limited subframe cluster information of the ePDCCH and ePHICH, or, wherein, the step of a terminal side receiving the detection-limited subframe cluster information of a control channel configured by the base station side comprises: the terminal side uniformly receiving the detection-limited subframe cluster information of the ePDCCH, PHICH and eCSS, or, wherein, the step of the base station side detecting the control channel according to the determined manner comprises:

when a CP configuration length of subframe 0 is a normal CP length, the terminal side detecting the control channel on all MBSFN subframes according to an extended CP length; or the terminal side blindly detecting the ePDCCH on the subframes inside the detection-limited subframe cluster according to an extended CP length; or the terminal side detecting the control channel in the PDCCH region and PDSCH region of all MBSFN subframes: or the terminal side using a normal CP length and an extended CP length as candidate lengths for detecting the control channel in the PDSCH region of all MBSFN subframes, if a target control channel is detected according to one length therein, not detecting with respect to another length again; or the terminal side detecting the control channel in the PDCCH region of all MBSFN subframes; or the terminal side detecting the control channel in the PDCCH region of the subframes inside the detection-limited subframe cluster; or the terminal side detecting the control channel only on the subframes outside the detection-limited subframe cluster; or the terminal side not detecting the control channel on the subframes inside the detection-limited subframe cluster, or, wherein, the step of a terminal detecting the control channel according to the determined manner comprises:

the terminal side detecting the control channel on all MBSFN subframes according to an extended CP length; or the terminal side blindly detecting the ePDCCH on subframes outside the detection-limited subframe cluster according to an extended CP length.

12. The method according to claim 7, further comprising:
the terminal side receiving one or more of the following information:

PMCH transmission subframe configuration, configuration of the PRS subframe only transmitted on the MBSFN subframe, CP length configuration of the subframe 0, configuration of the PRS subframe only transmitted on the MBSFN subframes when the subframe 0 is of a normal CP length, MBSFN subframe configuration, special subframe configuration of a TDD system, and CSI-RS subframe configuration.

13. A base station, comprising:

a first module, set to configure detection-limited subframe cluster information of a control channel for a terminal side, so as to notify the terminal side of a manner by which the base station side transmits the control channel; and a second module, set to transmit the control channel to the terminal side;

wherein, the second module is set to:

transmit the control channel only on subframes outside the detection-limited subframe cluster; or transmit the control channel through at least one or a combination of a plurality of the following manners:

the control channel is transmitted respectively in a control channel region independently configured for subframes inside the detection-limited subframe cluster and in a control channel region independently configured for the subframes outside the detection-limited subframe cluster;

the control channel is transmitted on the subframes inside the detection-limited subframe cluster according to a subframe Cyclic Prefix (CP) length configured in the detection-limited subframe cluster;

the control channel is transmitted respectively in a range of a detection aggregation level independently configured for subframes inside the detection-limited subframe cluster and in a range of a detection aggregation level independently configured for subframes outside the detection-limited subframe cluster;

the control channel is transmitted respectively on various parameters of detection control channel elements or detection resource units or enhanced resource element groups or resource element groups independently configured for subframes inside the detection-limited subframe cluster and on various parameters of detection control channel elements or detection resource units or enhanced resource element groups or resource element groups independently configured for subframes outside the detection-limited subframe cluster, wherein, the various parameters of detection control channel elements or detection resource units or enhanced resource element groups or resource element groups at least comprise one or more of the following: a size, a detection interval, a detection initial location, and a detection range;

the control channel is transmitted according to a detection Downlink Control Information (DCI) format type independently configured for subframes inside the detection-limited subframe cluster and according to a detection DCI format type independently configured for subframes outside the detection-limited subframe cluster;

the control channel is transmitted according to a number of candidate detection sets configured independently for subframes inside the detection-limited subframe cluster and according to a number of candidate detection sets configured independently for subframes outside the detection-limited subframe cluster; and the control channel is transmitted on a detection carrier independently configured for subframes inside the detection-limited subframe cluster and on a detection carrier independently configured for subframes outside the detection-limited subframe cluster;

the control channel at least comprises one or more of the following:

an Enhanced Physical Downlink Control Channel (ePDCCH), an Enhanced Physical Hybrid ARQ Indicator Channel (ePHICH) and an Enhanced Channel Signaling System (eCSS).

14. The base station according to claim 13, wherein,
the control channel regions, the subframe CP length, the range of the detection cluster level, the various parameters of detection control channel elements or detection resource units or enhanced resource element groups or resource element groups, the detection DCI format type, the number of candidate detection sets and the detection carrier independently configured for the subframes inside the detection-limited subframe cluster and the subframes outside the detection-limited subframe cluster are agreed on by the base station side and the terminal side in advance, or are configured for the terminal side by the base station side through dedicated or public high-layer signaling.

15. The base station according to claim 13, wherein, the first module is set to configure the detection-limited subframe cluster information of the control channel for the terminal side at least through one or more of the following manners:

configuring through Physical Multicast Channel (PMCH) transmission subframe configuration, through configuration of a Positioning Reference Signal (PRS) subframe only transmitted on Multicast Broadcast Single Frequency Network (MBSFN) subframes, through configuration of a PRS subframe configuration only transmitted on the MBSFN subframes when a subframe 0 is of a normal CP length, through MBSFN subframe configuration, through special subframe configuration of a Time Division Duplex (TDD) system, through Channel Statement Information Reference Signal (CSI-RS) subframe configuration, and through dedicated high-layer signaling configuration.

16. The base station according to claim 15, wherein, the first module is set to, when configuring the detection-limited subframe cluster information of the control channel through the dedicated higher-layer signaling, notify the terminal side of the detection-limited subframe cluster information of the control channel using a bitmap sequence, wherein, each bit in the bitmap sequence represents one subframe or resource block; or notify the terminal side of the detection-limited subframe cluster information of the control channel in a notification way of using a bitmap sequence and periodic configuration in conjunction with subframe offset configuration, preferably, wherein, the bitmap sequence is of 6 bits or 10 bits or 40 bits or 24 bits, or, wherein, the first module is set to notify the terminal side of the detection-limited subframe cluster information of the control channel through a subframe offset index and periodic configuration in combination with encoding when configuring the detection-limited subframe cluster information of a control channel for a terminal side.

17. The base station according to any of claims 13, wherein, the first module is set to, when configuring the detection-limited subframe cluster information of a control channel for a terminal side, independently configure, for the terminal side, the detection-limited subframe cluster information of ePDCCH and ePHICH respectively; or independently configure the detection-limited subframe cluster information of ePDCCH and eCSS respectively, and uniformly configure the detection-limited subframe cluster information of the ePDCCH and ePHICH, for the terminal side; or uniformly configure, for the terminal side, the detection-limited subframe cluster information of the ePDCCH, PHICH and eCSS.

18. The base station according to claim 13, further comprising a third module, set to configure, for the terminal side, one or more of the following information:

PMCH transmission subframe configuration, configuration of the PRS subframe only transmitted on the MBSFN subframe, CP length configuration of the subframe 0, configuration of the PRS subframe only transmitted on the MBSFN subframes when the subframe 0 is of a normal CP length, MBSFN subframe configuration, special subframe configuration of a TDD system, CSI-RS subframe configuration.

19. A terminal, comprising:

a first module, set to receive detection-limited subframe cluster information of a control channel configured by a base station side, and determine a manner by which the control channel is detected according to the detection-limited subframe cluster information;

a second module, set to detect the control channel according to the manner determined by the first module;

wherein, the manner by which the control channel is detected by the second module is that the control channel is only detected on subframes outside the detection-limited subframe cluster; or the control channel is detected according to at least one or a combination of a plurality of the following manners:

the control channel is detected respectively according to a control channel region independently configured for subframes inside the detection-limited subframe cluster on the subframes inside the detection-limited subframe cluster and in a control channel region independently configured for the subframes outside the limited subframe cluster on the subframes outside the limited subframe cluster;

the control channel is detected on the subframes inside the detection-limited subframe cluster according to a subframe Cyclic Prefix (CP) length configured in the detection-limited subframe cluster;

the control channel is detected respectively according to a range of a detection aggregation level independently configured for subframes inside the detection-limited subframe cluster on the subframes inside the detection-limited subframe cluster and according to a range of a detection aggregation level independently configured for subframes outside the detection-limited subframe cluster on the subframes outside the detection-limited subframe cluster;

the control channel is detected respectively according to various parameters of detection control channel elements or detection resource units or enhanced resource element groups or resource element groups independently configured for subframes inside the detection-limited subframe cluster on the subframes inside the detection-limited subframe cluster and according to various parameters of detection control channel elements or detection resource units or enhanced resource element groups or resource element groups independently configured for subframes outside the detection-limited subframe cluster on the subframes outside the detection-limited subframe cluster, wherein, the various parameters of detection control channel elements or detection resource units or enhanced resource element groups or resource element groups comprise one or more of the following: a size, a detection interval, a detection initial location, and a detection range;

the control channel is detected according to a detection Downlink Control Information (DCI) format type independently configured for subframes inside the detection-limited subframe cluster on the subframes inside the detection-limited subframe cluster and according to a detection DCI format type independently configured for subframes outside the detection-limited subframe cluster on the subframes outside the detection-limited subframe cluster; and the control channel is detected according to a number of candidate detection sets configured independently for subframes inside the detection-limited subframe cluster on the subframes inside the detection-limited subframe cluster and according to a number of candidate detection sets configured independently for subframes outside the detection-limited subframe cluster on the subframes outside the detection-limited subframe cluster;

the control channel is detected on a detection carrier independently configured for subframes inside the detection-limited subframe cluster and on a detection carrier independently configured for subframes outside the detection-limited subframe cluster;

the control channel at least comprises one or more of the following:

an Enhanced Physical Downlink Control Channel (ePDCCH), an Enhanced Physical Hybrid ARQ Indicator Channel (ePHICH) and an Enhanced Channel Signaling System (eCSS).

20. The terminal according to claim 19, wherein, the control channel regions, the subframe CP length, the range of the detection cluster level, the various parameters of detection control channel elements or detection resource units or enhanced resource element groups or resource element groups, the detection DCI format type, the number of candidate detection sets and the detection carrier independently configured for the subframes inside the detection-limited subframe cluster and the subframes outside the detection-limited subframe cluster are agreed on by the terminal side and the base station side in advance, or are received by the terminal side through dedicated high-layer signaling, or are received by the terminal side through public high-layer signaling, preferably, wherein, the public high-layer signaling comprises: a master information block and system information block.

21. The terminal according to claim 19, wherein, the first module is set to receive the detection-limited subframe cluster information of the control channel configured by the base station side at least through one or more of the following manners:

receiving through Physical Multicast Channel (PMCH) transmission subframe configuration information, through configuration information of a Positioning Reference Signal (PRS) subframe only transmitted on Multicast Broadcast Single Frequency Network (MBSFN) subframes, through CP length configuration information of a subframe 0, through configuration information of a PRS subframe only transmitted on the MBSFN subframes when the subframe 0 is of a normal CP length, through MBSFN subframe configuration information, through special subframe configuration information of a Time Division Duplex (TDD) system, through Channel Statement Information Reference Signal (CSI-RS) subframe configuration information, and through dedicated high-layer signaling configuration information.

22. The terminal according to claim 21, wherein, the first module is set to receive the detection-limited subframe cluster information of the control channel by a bitmap sequence when receiving the detection-limited subframe cluster information of the control channel configured by the base station side through the dedicated higher-layer signaling, wherein, each bit in the bitmap sequence represents one subframe or resource block, preferably, wherein, the bitmap sequence is of 6 bits or 10 bits or 40 bits or 24 bits, or, wherein, the first module is set to receive the detection-limited subframe cluster information of the control channel by a way of using a bitmap sequence and periodic configuration in conjunction with subframe offset configuration when receiving the detection-limited subframe cluster information of the control channel configured by the base station side through the dedicated higher-layer signaling, preferably, wherein, the bitmap sequence is of 6 bits or 10 bits or 40 bits or 24 bits, or, wherein, the first module is set to receive the detection-limited subframe cluster information of the control channel through a subframe offset index and periodic configuration in combination with encoding.

23. The terminal according to claim 19, wherein, the first module is set to independently receive the detection-limited subframe cluster information of ePDCCH and ePHICH respectively, or, wherein, the first module is set to independently receive the detection-limited subframe cluster information of ePDCCH and eCSS respectively, and uniformly receive the detection-limited subframe cluster information of the ePDCCH and ePHICH, or, wherein, the first module is set to uniformly receive the detection-limited subframe cluster information of the ePDCCH, PHICH and eCSS, or, wherein, the second module is set to detect the control channel by the following manner:

when a CP configuration length of the subframe 0 is a normal CP length, detecting the control channel on all MBSFN subframes according to an extended CP length; or blindly detecting the ePDCCH on the subframes inside the detection-limited subframe cluster according to an extended CP length; or detecting the control channel in a PDCCH region and PDSCH region of all MBSFN subframes; or using a normal CP length and an extended CP length as candidate lengths for detecting the control channel in the PDSCH region of all MBSFN subframes, if a target control channel is detected according to one length therein, not detecting with respect to another length again; or detecting the control channel in the PDCCH region of all MBSFN subframes; or detecting the control channel in the PDCCH region of the subframes inside the detection-limited subframe cluster; or only detecting the control channel on the subframes outside the detection-limited subframe cluster; or not detecting the control channel on the subframes inside the detection-limited subframe cluster, or, wherein, the second module is set to detect the control channel by the following manner:

detecting the control channel on all MBSFN subframes according to an extended CP length; or blindly detecting the ePDCCH on subframes outside the detection-limited subframe cluster according to an extended CP length.

24. The terminal according to claim 19, further comprising a third module, set to receive one or more of the following information:

PMCH transmission subframe configuration, configuration of the PRS subframe only transmitted on the MBSFN subframe, CP length configuration of the subframe 0, configuration of the PRS subframe only transmitted on the MBSFN subframes when the subframe 0 is of a normal CP length, MBSFN subframe configuration, special subframe configuration of a TDD system and CSI-RS subframe configuration.

* * * * *